(12) United States Patent
Nagahata et al.

(10) Patent No.: US 8,790,740 B2
(45) Date of Patent: Jul. 29, 2014

(54) RESISTANT STARCH-RICH STARCH, BEVERAGE AND FOOD USING THE SAME, AND METHOD OF PRODUCING RESISTANT STARCH-RICH STARCH

(75) Inventors: Yuya Nagahata, Tokyo (JP); Isao Kobayashi, Tokyo (JP); Masaru Goto, Tokyo (JP)

(73) Assignee: J-Oil Mills, Inc., Tokyo (JP)

( * ) Notice: Subject to any disclaimer, the term of this patent is extended or adjusted under 35 U.S.C. 154(b) by 0 days.

(21) Appl. No.: 13/500,545

(22) PCT Filed: Oct. 4, 2010

(86) PCT No.: PCT/JP2010/005930
§ 371 (c)(1),
(2), (4) Date: Apr. 5, 2012

(87) PCT Pub. No.: WO2011/045902
PCT Pub. Date: Apr. 21, 2011

(65) Prior Publication Data
US 2012/0196023 A1    Aug. 2, 2012

(30) Foreign Application Priority Data
Oct. 16, 2009   (JP) ................................. 2009-239511

(51) Int. Cl.
*A23L 1/05*    (2006.01)
*C08B 31/00*   (2006.01)

(52) U.S. Cl.
USPC .......................................... 426/661; 536/102

(58) Field of Classification Search
None
See application file for complete search history.

(56) References Cited

U.S. PATENT DOCUMENTS

| | | | | |
|---|---|---|---|---|
| 5,695,803 | A | * | 12/1997 | Sharp et al. ................ 426/549 |
| 6,468,355 | B1 | * | 10/2002 | Thompson et al. ............ 127/71 |
| 2006/0078667 | A1 | | 4/2006 | Stanley et al. |
| 2010/0183797 | A1 | | 7/2010 | Yamaku et al. |

FOREIGN PATENT DOCUMENTS

| | | |
|---|---|---|
| JP | 05-506564 | 9/1993 |
| JP | 7-252301 | 3/1995 |
| JP | 9-012601 | 1/1997 |
| JP | 10-191931 | 7/1998 |
| JP | 10-195104 | 7/1998 |
| JP | 11-005802 | 1/1999 |
| JP | 2001-231469 | 8/2001 |
| JP | 2008-516050 | 5/2008 |
| JP | 2008-280466 | 11/2008 |
| WO | 00/19841 | 4/2000 |
| WO | 2008/155892 | 12/2008 |

OTHER PUBLICATIONS

Richard K. Le Leu et al., "Effect of high amylose maize starches on colonic fermentation and apoptotic response to DNA-damage in the colon of rats", Nutrition & Metabolism, Mar. 7, 2009, vol. 6, issue 11.
Martine Champ et al., "Advances in dietary fibre characterisation. 1. Definition of dietary fibre, physiological relevance, health benefits and analytical aspects", Nutrition Research Reviews, 2003, pp. 71-82.
International search report dated Dec. 14, 2010.

* cited by examiner

*Primary Examiner* — Humera Sheikh
*Assistant Examiner* — Subbalakshmi Prakash
(74) *Attorney, Agent, or Firm* — Rankin, Hill & Clark LLP

(57) ABSTRACT

Disclosed is a resistant starch-rich starch which satisfies the requirements (a), (b), (c) and (d), below:

(a) showing a resistant starch content, measured by the AOAC Official Method 2002.02 for measuring resistant starch, of 60% or more;

(b) showing a molecular weight peak in the range from $6 \times 10^3$ or larger to $4 \times 10^4$ or smaller;

(c) showing a molecular weight dispersion of 1.5 or larger to 6.0 or smaller; and (d) showing a gelatinization enthalpy, measured by differential scanning calorimetry over the range from 50° C. to 130° C., of 10 J/g or smaller.

6 Claims, 7 Drawing Sheets

○ : RESISTANT STARCH CONTENT ≧ 70%
● : 70% > RESISTANT STARCH CONTENT ≧ 65%
■ : 65% > RESISTANT STARCH CONTENT ≧ 60%
× : 60% > RESISTANT STARCH CONTENT.

(a)　　　　(b)　　　　(c)

(a)  (b)

RESISTANT STARCH-RICH STARCH, BEVERAGE AND FOOD USING THE SAME, AND METHOD OF PRODUCING RESISTANT STARCH-RICH STARCH

TECHNICAL FIELD

The present invention relates to a resistant starch-rich starch, beverage and food using the same, and a method of producing a resistant starch-rich starch.

BACKGROUND ART

Dietary fiber shows various physiological actions including improvement in intestinal environment, suppression of elevation of blood sugar level, and suppression of cholesterol level, intake of which is however believed to be insufficient in Japan, Europe and the United States. While dietary fiber may be taken from various plants, it has to be highly purified before being applied to a wide variety of processed foods, so that the cost will elevate due to complicated processes necessary therefor. Use of dietary fiber as a partial substituent of cereal flour raises a problem that the dietary fiber has physical properties different from those of starch component which is a main constituent of cereal flour, and therefore largely affects taste and processes.

On the other hand, starch is readily digestible in general, but contains an indigestible fraction called resistant starch. It has been becoming clear that the resistant starch acts similarly to dietary fiber in vivo. Reported nutritional benefits include improvement in intestinal environment, suppression of elevation of blood sugar level, suppression of cholesterol level, and improvement in lipid metabolism.

Starch is abundant in plants, and is relatively easy to purify. Starch may, therefore, be supplied at lower cost than dietary fiber. Moreover, since resistant starch-containing starch is partially substitutable for cereal flour such as wheat flour, so that it is miscible in a relatively easy manner, without heavily affecting the original processes or ingredient. However, there has been a practical limit in the ratio of substitution by the resistant starch-containing starch. Resistant starch content in intact resistant starch-containing starch has been found to be 45% or less in general. A problem has, therefore, remained in that resistant starch content cannot be elevated as expected from the amount of addition, even if it were added to foods.

In this situation, there has been reported techniques of producing processed starches which are enriched in resistant starch by processing raw starch.

Patent Document 1 (International Publication WO2000/19841, pamphlet) describes acid treatment of high-amylose corn starch, used as a raw material, in alcohol. The processed starch obtained by the acid treatment, having the number-average molecular weight in the range from 10,000 to 90,000, reportedly expresses slow digestivity in vivo.

Patent Document 2 (Japanese Laid-Open Patent Publication No. 2001-231469) describes that high-amylose starch, used as a raw material, is heated under a water percentage and temperature insufficient for decomposing granularity of starch, and is digested to remove the amorphous portion, to thereby enhance the resistivity. More specifically, HYLON VII (registered trademark, a corn starch with 70% amylose content), used as a raw material, was heated under a total water percentage of approximately 38%, at approximately 98.9° C. for 2 hours, and digested with pancreatin. The thus-obtained starch reportedly had a total dietary fiber (TDF) of 50%, and a resistant starch (RS) content of 90% (Example 1a). The document also describes that the thus-obtained resistant starch was found to show a molecular weight peak over the range from 2,000 to 80,000, and a heat of gelatinization of approximately 20 J/g.

Patent Document 3 (Japanese Laid-Open Patent Publication No. H11-5802) describes a technique of enriching hardly-digestible component, by keeping an aqueous dispersion of high-amylose starch at a temperature not lower than the temperature at which the starch components starts to elute, not higher than the temperature at which the starch begin to decompose its granularity, and by allowing α-amylase to react therewith. The document describes an exemplary case where the hardly-digestible component was enriched up to 68.2% when measured according to the Prosky method (Example 3).

Patent Document 4 (Published Japanese Translation of PCT International Publication No. 2008-516050) describes that production of an enzyme-resistant starch by using high-amylose starch as a raw material, and heating it in a moist state under the presence of alcohol. The document describes an exemplary case where the total dietary fiber content was reached approximately 60 to 70%, and the Englyst resistant starch value was averaged at 43 (Example 4).

Patent Document 5 (Japanese Laid-Open Patent Publication No. H10-195104) discloses a processed starch enriched with dietary fiber, obtained by subjecting high-amylose corn starch to heat-moisture treatment.

Patent Document 6 (Japanese Laid-Open Patent Publication No. H09-12601) discloses a method of producing amylase-resistant starch, obtained by subjecting high-amylose starch to heat-moisture treatment.

Patent Document 7 (Japanese Laid-Open Patent Publication No. H10-191931) discloses a resistant starch obtained by subjecting starch to debranching and retrogradation treatment.

Patent Document 8 (Published Japanese Translation of PCT International Publication No. H05-506564) describes a technique of enzymatic hydrolysis of retrograded high-amylose starch.

Patent Document 9 (International Publication WO2008/155892, pamphlet) describes a method of producing a resistant starch-rich starch, by bringing high-amylose corn starch into contact with pressurized hot water at 165° C. to 260° C.

Patent Document 10 (Japanese Laid-Open Patent Publication No. 2008-280466) describes a technique of producing amylose grains making use of an enzyme reaction. According to the description, the amylose grains obtained by the method of this document has a specific weight-average molecular weight and molecular weight dispersion, and is substantially resistant against digestion by α-amylase.

RELATED DOCUMENT

Patent Document

[Patent Document 1] International Publication WO2000/19841, pamphlet
[Patent Document 2] Japanese Laid-Open Patent Publication No. 2001-231469
[Patent Document 3] Japanese Laid-Open Patent Publication No. H11-5802
[Patent Document 4] Published Japanese Translation of PCT International Publication No. 2008-516050
[Patent Document 5] Japanese Laid-Open Patent Publication No. H10-195104
[Patent Document 6] Japanese Laid-Open Patent Publication No. H09-12601

[Patent Document 7] Japanese Laid-Open Patent Publication No. H10-191931
[Patent Document 8] Published Japanese Translation of PCT International Publication No. H05-506564
[Patent Document 9] International Publication WO2008/155892, pamphlet
[Patent Document 10] Japanese Laid-Open Patent Publication No. 2008-280466

Non-Patent Document

[Non-Patent Document 1] Richard K Le Leu et al., Effect of high amylose maize starches on colonic fermentation and apoptotic response to DNA-damage in the colon of rats, Nutrition and Metabolism. 6(11), 2009
[Non-Patent Document 2] Martine Champ et al., Advances in dietary fibre characterisation. 1. Definition of dietary fibre, physiological relevance, health benefits and analytical aspects, Nutrition Research Reviews 16, 2003, p. 71-82

DISCLOSURE OF THE INVENTION

Most of the above-described techniques of producing processed starch were directed to increase in the total dietary fiber content, and therefore adopted the Prosky method as a method of measuring the total dietary fiber content. On the other hand, there has been known the AOAC Official Method 2002.02, which is a method of quantifying resistant starch, more conforming to in vivo digestive conditions of starch.

There has been a case where the starch, the total dietary fiber content of which was confirmed by the Prosky method, sometimes gave a lower level of total dietary fiber content when measured by the AOAC Official Method 2002.02. More specifically, Non-Patent Document 1 describes that the resistant starch content differs when measured by the Prosky method and by the AOAC Official Method 2002.02. The reason for the difference in the measured values is mainly ascribable to difference in digestive conditions. In the Prosky method, digestion is proceeded at 100° C. for a short period (15 to 30 minutes) using a bacterial heat-resistant α-amylase, followed by digestion at 60° C. with protease, and further followed by digestion with amyloglucosidase. On the other hand, in the AOAC Official Method 2002.02, the digestion is proceeded under conditions which simulate in vivo conditions, such as 37° C. for a long period (16 hours) with pancreatic amylase and amyloglucosidase. Non-Patent Document 2 points out that the Prosky method suffers from a problem of inaccurate quantification of resistant starch due to the digestive conditions largely different from real conditions, and that the AOAC Official Method 2002.02 is a quantitative method more correlative to in vivo test.

In this viewpoint, the documents aforementioned in BACKGROUND ART have room for improvement with respect to digestion resistance of starch under in vivo conditions. More specifically, the present inventors re-evaluated the processed starches, obtained by the methods of aforementioned Patent Documents 1 to 3, and 5 to 8, by the AOAC Official Method 2002.02, and found that the resistant starch content was less than 60%, as described later in EXAMPLES.

Production of beverage and food using the resistant starch-containing starch often goes through cooking under heating. It is therefore undesirable that the resistant starch is lost in the process of cooking under heating, no matter how the resistant starch content of starch to be added is high.

In this viewpoint, the above-described processed starches have room for improvement with respect to resistance of resistant starch against heating. For example, the present inventors examined the method described in Patent Document 9, and confirmed that the processed starch obtained by the method of the document still had room for improvement because the resistant starch was lost in the process of cooking under heating, as described later in EXAMPLES.

Also the processed starch obtained by the method of Patent Document 4 still had room for improvement in texture.

Considering the above-described situation, it is an object of the present invention to provide starch enriched with resistant starch which shows a high in vivo digestion resistance, and ensures excellent heat resistance of the resistant starch.

According to the present invention, there is provided a resistant starch-rich starch which satisfies the requirements (a), (b), (c) and (d), below:
(a) showing a resistant starch content, measured by the AOAC Official Method 2002.02 for measuring resistant starch, of 60% or more;
(b) showing a molecular weight peak in the range from $6 \times 10^3$ or larger to $4 \times 10^4$ or smaller;
(c) showing a molecular weight dispersion of 1.5 or larger to 6.0 or smaller; and
(d) showing a gelatinization enthalpy, measured by differential scanning calorimetry over the range from 50° C. to 130° C., of 10 J/g or smaller.

According to the present invention, there is also provided beverage and food which contain the resistant starch-rich starch of the above-described invention.

According to the present invention which satisfies the requirements (a) to (d), a processed starch enriched with resistant starch, and stable against heating may be obtained.

Accordingly, the beverage and food may keep high contents of resistant starch at the time of drinking and eating, even if they went through heating.

In order to obtain the processed starch which satisfies the above-described requirements (a) to (d), conditions regarding the method of the present invention and devices may arbitrarily be selected.

For example, according to the present invention, there is provided a method of producing a resistant starch-rich starch which includes a process of subjecting an amylose-rich starch having an amylose content of 40% or more, used as a raw material, to acid treatment in an aqueous inorganic acid solution.

According to the present invention, a starch which is enriched with resistant starch, and ensures high resistance of the resistant starch against heating, may be achieved.

DESCRIPTION OF THE EMBODIMENTS

The resistant starch-rich starch of the present invention satisfies the requirements (a), (b), (c) and (d) below:

(a) showing a resistant starch content, measured by the AOAC Official Method 2002.02 for measuring resistant starch, of 60% or more;

(b) showing a molecular weight peak in the range from $6\times10^3$ or larger to $4\times10^4$ or smaller;

(c) showing a molecular weight dispersion of 1.5 or larger to 6.0 or smaller; and (d) showing a gelatinization enthalpy, measured by differential scanning calorimetry over the range from 50° C. to 130° C., of 10 J/g or smaller.

Technical meanings of the individual conditions will be explained below.

The resistant starch-rich starch of the present invention satisfies the requirement (a), and has a distinctively larger resistant starch content as compared with those obtained by the conventional methods of production.

From the viewpoint of further increasing the resistant starch content in the early stage, the resistant starch content of the resistant starch-rich starch of the present invention, measured by the AOAC Official Method 2002.02 for measuring resistant starch, is preferably 65% or more, and more preferably 70% or more. There is no special limitation on the upper limit of the resistant starch content of the resistant starch-rich starch of the present invention, and may be 100% or less, typically 90% or less.

Note that the resistant starch content in the present invention is defined as weight of resistant starch relative to dry weight of sample (w/w).

By satisfying the requirements (b) and (c), the starch is stably increased in the content of resistant starch.

Among them, the requirement (b) specifies a range of molecular weight of the resistant starch-rich starch.

Figure 1:
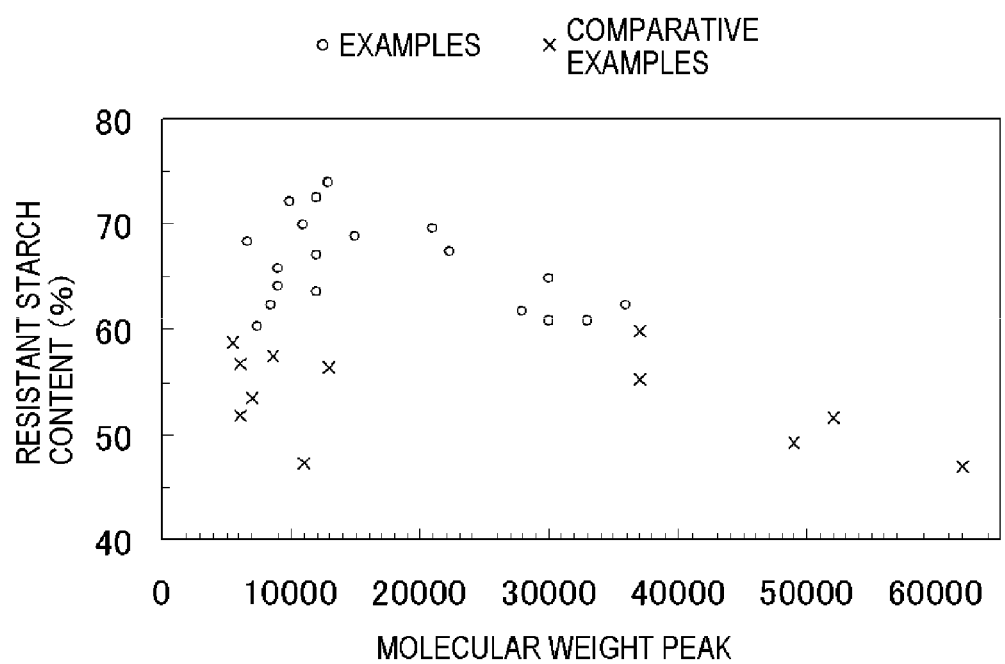
FIG. 1 is a drawing illustrating relations between molecular weight peak of starch and resistant starch content in one embodiment.

FIG. 1 is a drawing illustrating results of examination by the present inventors, made on molecular weight peaks of the high-amylose corn starch after acid treatment, and resistant starch content. It is found from FIG. 1 that starches having resistant starch contents exceeding 60% are stably obtained, when the molecular weight peaks fall in the range from $6\times10^3$ or larger to $4\times10^4$ or smaller. Note that FIG. 1 also shows starches having resistant starch contents of less than 60%, despite that the molecular weight peaks fall in the range from $6\times10^3$ or larger to $4\times10^4$ or smaller (Comparative Examples). These plots represent acid-treated starches produced under conditions out of the predetermined ranges described later, and satisfy requirement (b), but do not satisfy requirement (a). In short, as described later in EXAMPLES, the starches having resistant starch contents exceeding 60% are stably obtained, when the molecular weight peaks fall in the range from $6\times10^3$ or larger to $4\times10^4$ or smaller, by appropriately selecting the conditions for production.

Reason why the resistant starch-rich starch is obtained after the acid treatment, only in the above-described specific range of molecular weight peak, is supposed as below. In the acid treatment of starch, a part of molecular chains which compose the starch is hydrolyzed, and the starch is decomposed to reduce the molecular weight. Starch grains having the molecular chains cut to some degree then optimize the spatial arrangement of molecules, finally into a more dense state. Accordingly, the more the decomposition by the acid treatment proceeds, the higher the digestion resistance of the starch will be. On the other hand, if the acid treatment proceeds to an excessive degree, the grain structure will be destructed, and thereby the digestion resistance of starch will be lost.

In view of more stably obtaining the resistant starch-rich starch, the molecular weight peak may typically fall on $6.5\times10^3$ or above, and preferably on $8\times10^3$ or above. In view of still more stably obtaining the resistant starch-rich starch, the molecular weight peak may typically fall on $3.6\times10^4$ or below, preferably on $2.5\times10^4$ or below, and more preferably on $1.5\times10^4$ or below.

Next, the requirement (c) specifies the molecular weight dispersion.

The molecular weight dispersion in the requirement (c) refers to ratio Mw/Mn of weight-average molecular weight Mw relative to number-average molecular weight Mn.

Figure 2:
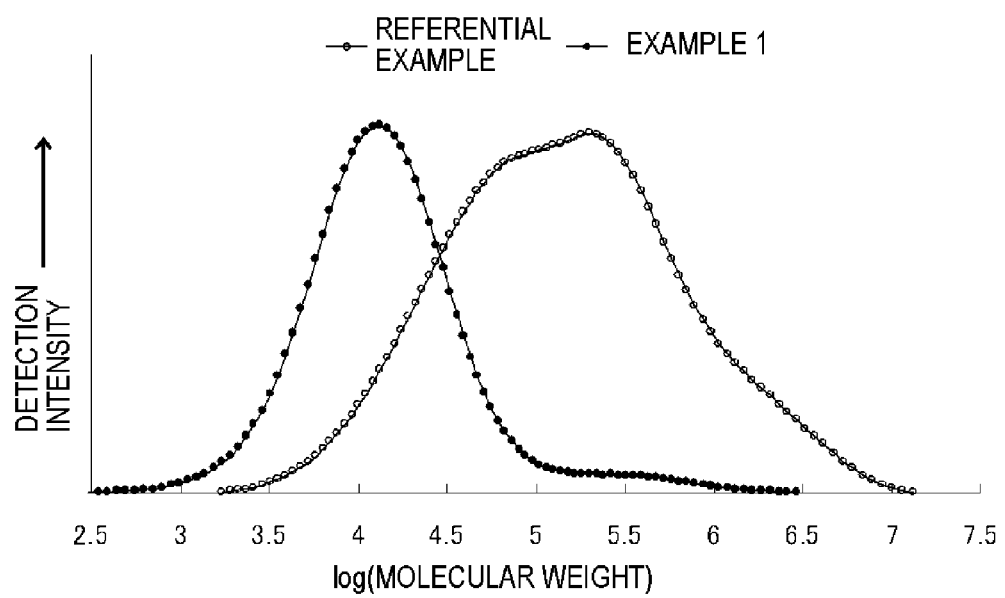
FIG. 2 is a drawing illustrating a molecular weight distribution of a resistant starch-rich starch in one embodiment.

FIG. 2 is a drawing illustrating results of examination by the present inventors, made on changes in molecular weight distribution patterns of resistant starch-rich starch, observed after the acid treatment of high-amylose corn starch. The molecular weight shown in FIG. 2, and also in FIG. 3 described later, was measured by gel permeation chromatography (GPC) and expressed on the basis of pullulan used as a standard material. It is found from FIG. 2 that a molecular weight distribution pattern of the resistant starch-rich starch obtained after the acid treatment (Example 1) is narrower in the distribution range as compared with the intact high-amylose corn starch (Referential Example), and gives a single peak. The degree of broadening of molecular weight is evaluated based on molecular weight dispersion. The molecular weight dispersion represents a ratio of weight-average molecular weight (Mw) and number-average molecular weight (Mn). Polymers generally contain molecules having various degrees of polymerization, and therefore show the molecular weights over certain ranges. Polymer characterized by a single degree of polymerization will have a Mw/Mn of 1, whereas larger variation will give larger molecular weight dispersion.

Figure 3:
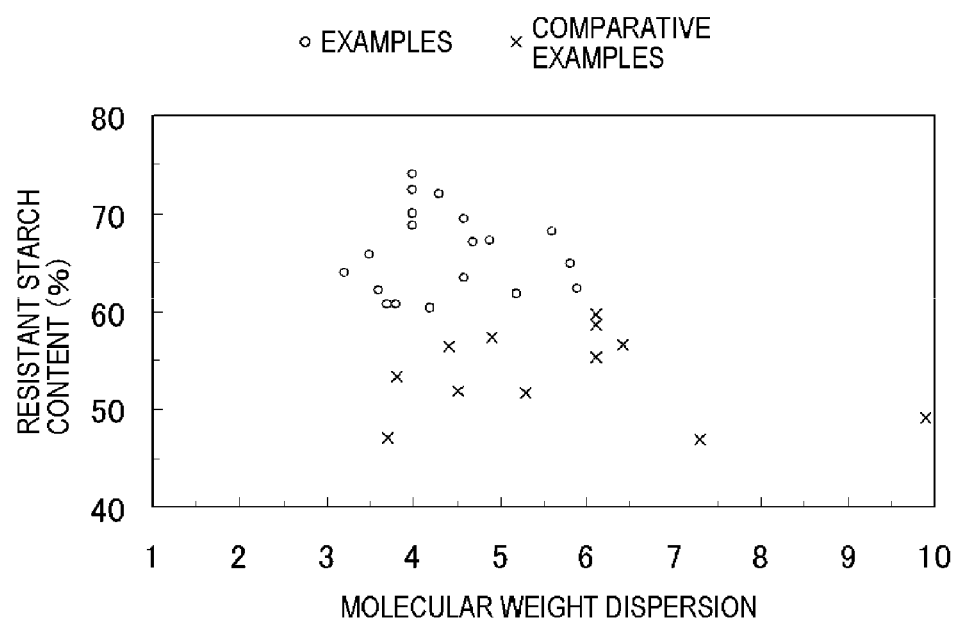
FIG. 3 is a drawing illustrating relations between molecular weight dispersion of starch and resistant starch content in one embodiment.

FIG. 3 is a drawing illustrating relations between the molecular weight dispersion of high-amylose corn starch after the acid treatment, and the resistant starch content. It is known from FIG. 3 that starches having large resistant starch contents give the molecular weight dispersion fallen in a specific range, that is, the range which satisfies the requirement (c) described in the above.

The reason why may be supposed as follows. Since the molecular weights of enzyme-resistant starches fall in a certain range, so that increase in the components having molecular weight out of the predetermined certain range will make the starches more susceptible to the digestion. On the other hand, while the starches reduce the molecular weights also by enzyme treatment as the reaction proceeds, the molecular weight distributions remain in certain ranges. Although details of difference of reaction mechanism between the acid treatment and enzyme treatment remain unclear, this sort of difference in the range of molecular weight distribution is supposed to be expressed in the difference between the enzyme treatment and acid treatment.

From the viewpoint of desirability of texture, the starch having excessively large molecular weight dispersion may fail in obtaining desirable texture. In this point of view, if the molecular weight dispersion falls in the range which satisfies the requirement (c), fraction having low molecular weight or fraction having large molecular weight may be suppressed from being excessively abundant, so that food mixed with the starch may be suppressed from being too floury or too hard.

From the viewpoint of desirability of texture, the lower limit of the molecular weight dispersion is adjusted to 1.5 or larger, preferably 2.0 or larger, and more preferably 3.0 or larger. Since the starch having too small molecular weight distribution may sometimes result in undesirable floury texture, so that the molecular weight peak preferably has a certain range.

On the other hand, from the viewpoint of further stably raising the resistant starch content, the upper limit of the molecular weight dispersion is adjusted to 6.0 or smaller, preferably 5.5 or smaller, and more preferably 5.0 or smaller.

As a consequence, from the viewpoint of balancing the ratio of resistant starch with the texture, the molecular weight dispersion in the present invention is preferably adjusted to the range from 1.5 or larger and 6.0 or smaller, preferably from 2.0 or larger and 5.5 or smaller, and more preferably 3.0 or larger and 5.0 or smaller.

The molecular weight of starch may be measured by GPC (expressed on the basis of pullulan used as a standard).

Next, the requirement (d) will be explained.

In the present invention, in order to satisfy the requirement (d), the starch may originally be resistant starch-rich, and may stay resistant starch-rich also after the heat treatment.

More specifically, it is also possible to achieve a resistant starch content of 60% or more for example, and preferably 70% or more, after heating at 200° C. for 20 minutes.

Gelatinization enthalpy herein refers to energy required when starch is converted into paste under heating. Starch is converted into paste at a certain temperature, when heated in the presence of water. Since the conversion to paste needs energy, so that an endothermic reaction occurs. By differential scanning calorimetry (DSC), amount of heat adsorbed in association with the temperature changes is measured in the form of peak, and the area of the peak is calculated as the gelatinization enthalpy. The peak area is given by an area surrounded by the peak and the base line, as illustrated in FIG. 4.

Figure 4:
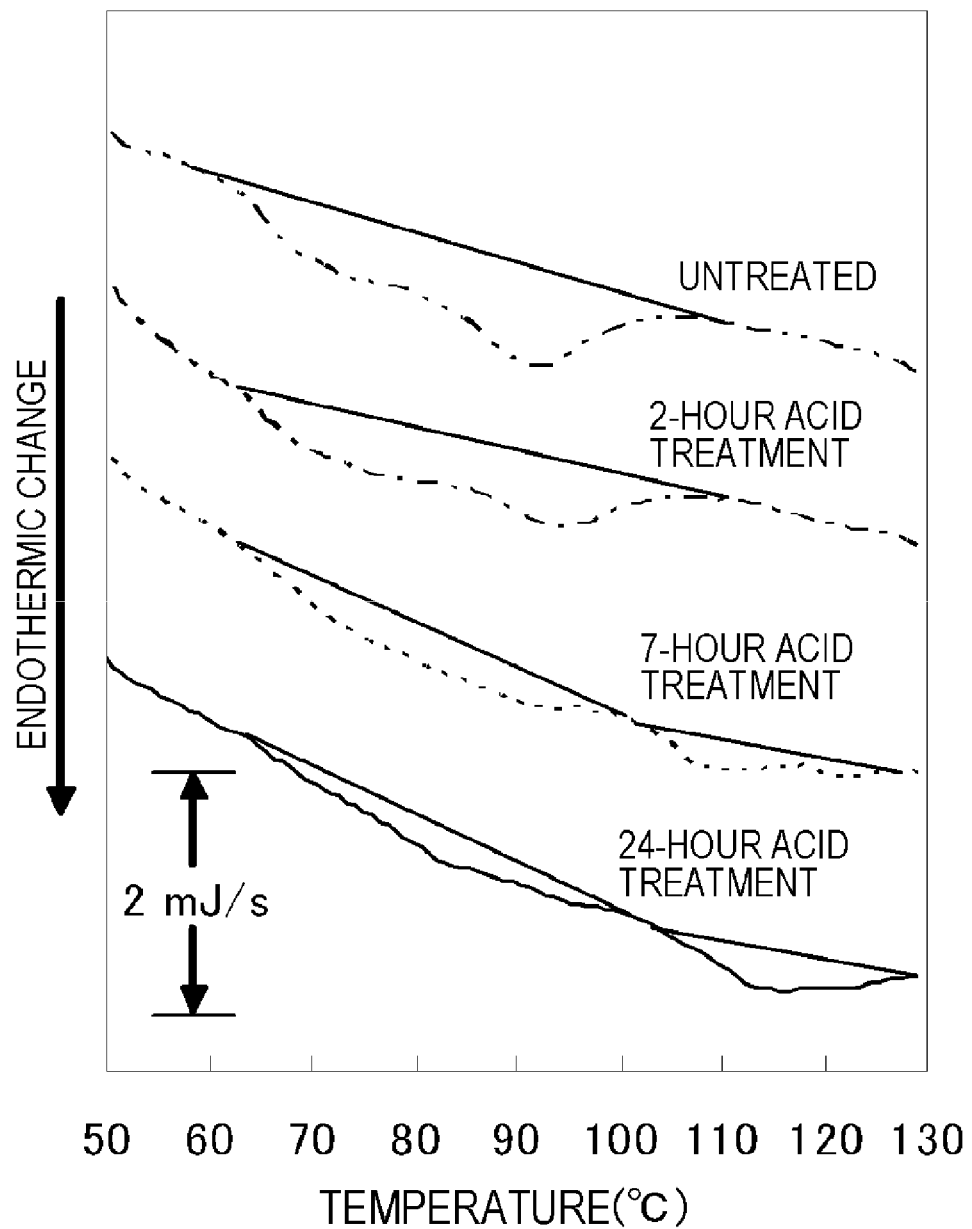
FIG. 4 is a drawing illustrating results of differential scanning calorimetry of starch in one embodiment.

FIG. 4 is a drawing illustrating results of examination by the present inventors, made on effects of the acid treatment of high-amylose corn starch exerted on DSC curve. In general, digestivity of starch improves after gelatinization. Starch stays in a crystallized state before heating, and is hard to be digested by digestive enzymes. The crystallized state, however, changes after heating and gelatinization, into a state more digestive by the enzymes. Accordingly, a starch which shows a small endothermic peak in DSC means that the starch causes less decrease in the resistant starch content after heating (also expressed as "highly heat resistant", hereinafter). In practice, the heat resistance of resistant starch is affected not only by gelatinization enthalpy, but also by gelatinization temperature, and molecular weight distribution (molecular weight peak, molecular weight dispersion). For example, a starch which shows a high gelatinization temperature shows high heat resistance, since it will gelatinize only after heated at higher temperatures. Accordingly, the gelatinization enthalpy may be used as an index for heat resistance, among starches having similar levels of gelatinization temperature, molecular weight peak, and molecular weight dispersion.

As is known from FIG. 4, the high-amylose corn starch in the process of acid treatment shows smaller endothermic peaks as the acid treatment proceeds. The smallness of the endothermic peak observed in DSC is one essential feature of the resistant starch-rich starch of the present invention, which is more specifically 10 J/g or smaller, preferably 8 J/g or smaller, and more preferably 6 J/g or smaller. By the selection, beverage and food which ensure high content of resistant starch even after cooking under heating may be obtained in a stable manner. There is no special limitation on the lower limit of the gelatinization enthalpy, allowing 1 J/g or above, for example.

According to the present invention, a resistant starch-rich starch which contains a high level of resistant starch and excellent in stability under heating may be obtained, by satisfying all of the requirements (a) to (d) described in the above.

Next, the method of producing resistant starch-rich starch of the present invention will be explained.

In this specification, the individual terms are defined as follow, unless otherwise specifically stated. Note also that the resistant starch may occasionally be referred to as "RS" in this specification.

Water content: ratio of water content relative to wet weight of starch (w/w);

slurry concentration: ratio of dry weight of starch relative to weight of starch slurry (w/w);

acid normality: normality of acid in water, including water content derived from starch, in a reaction solution;

resistant starch content: ratio of weight of resistant starch relative to dry weight of sample (w/w); and resistant starch-rich starch: starch having a resistant starch content of 60% or more.

The resistant starch-rich starch of the present invention may be obtained typically by using amylose-rich starch, having an amylose content of 40% or more, as a raw material, and by subjecting the raw material to acid treatment in an aqueous inorganic acid solution.

Origin of the amylose-rich starch used as a raw material may be corn, potato, rice, wheat, sweat potato, tapioca and other arbitrary sources. From the viewpoint of availability, high-amylose corn starch is preferable. The high-amylose corn starch is a corn starch enhanced in the amylose content by selective breeding, and those having an amylose content of 40% or more, and 70% or more, are currently available. In view of further stably increasing the resistant starch content in the resistant starch-rich starch, any starch having an amylose content of 40% or more may be adoptable.

In the acid treatment, starch as a raw material and purified water are placed in a reactor. Alternatively, an acidic water preliminarily prepared by dissolving an inorganic acid into water, and a raw material are placed in a reactor. In view of allowing the acid treatment to proceed more stably, it is preferable that the whole portion of starch is uniformly dispersed in the aqueous phase, or stays in the form of slurry. For this purpose, concentration of the starch slurry to be subjected to the acid treatment is preferably adjusted to 50% by weight or less for example, more preferably to 20% by weight or more and 40% by weight or less. Too large slurry concentration will elevate viscosity of the slurry, and may make it difficult to uniformly stir the slurry.

Acids used for the acid treatment may be exemplified by hydrochloric acid, sulfuric acid, nitric acid and so forth, without limiting species and purity.

The acid treatment reaction is proceeded by appropriately selecting temperature and acid concentration, so that the resultant acid-treated starch satisfies the requirements (a) to (d). It is, however, difficult to obtain the resistant starch-rich starch which satisfies the requirements (a) to (d) under the conventional acid treatment conditions. Now in the present invention, the inorganic acid concentration, reaction temperature and reaction time, for example, in the process of acid treatment are set to specific conditions. The individual conditions will be explained in detail.

First, acid treatment time is set so as to satisfy the requirements (a) to (d). From the viewpoint of more surely suppress denaturation during the reaction, the time necessary for the acid treatment is preferably limited to 3 days or shorter, and preferably 2 days or shorter.

Inorganic acid concentration and reaction temperature of the acid treatment are selected so as to satisfy the expression (1) below:

$$(5.54 \times (4.20)^{(T-40)/10})^{(-0.879)} \leq C \leq -0.000016 \times T^3 + 0.00068 \times T^2 - 0.028 \times T + 4.3 \quad (1)$$

(where, in the expression (1), T: reaction temperature (° C.), C: normality (N) of an inorganic acid in the aqueous inorganic acid solution.)

Too high levels of the inorganic acid normality and reaction temperature may sometimes fail in elevating the resistant starch content to a sufficient degree. In contrast, too low levels may excessively elongate the time necessary for the acid treatment reaction.

By satisfying the expression (1), the resistant starch content may be raised in an efficient and stable manner.

Figure 5:
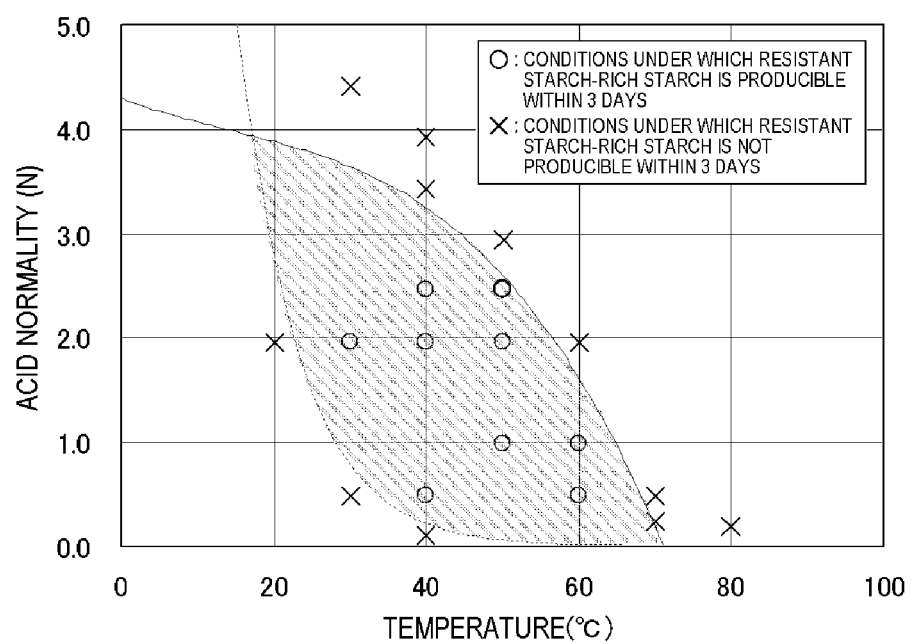
FIG. 5 is a drawing illustrating acid treatment conditions in one embodiment.

FIG. 5 is a drawing illustrating results of examination by the present inventors, made on relations between the reaction temperature (° C.) and acid normality (N) in the acid treatment. In FIG. 5, plots "○" represent conditions under which the resistant starch-rich starch may be produced within 3 days, whereas plots "x" represent conditions under which the resistant starch-rich starch cannot be produced within 3 days. The plots "○" fall in a hatched area surrounded by two curves in FIG. 5. Accordingly, typically by allowing the acid treatment to proceed according to the acid normality and temperature which fall in the area surrounded by the curves in FIG. 5, the starches which satisfy the requirements (a) to (d) may be produced within 3 days.

In addition, the reaction time of the acid treatment may be uniquely determined by the expression (2) below, using factors of reaction temperature and acid normality:

$$13.0 \times C^{(-1.14)} \times (1/4.2)^{(T-40)/10} \leq t \leq 180 \times C^{(-1.58)} \times (1/4.2)^{(T-40)/10} \quad (2)$$

(where, in the expression (2), T: reaction temperature (° C.), C: normality (N) of an inorganic acid in the aqueous inorganic acid solution, and t: reaction time (hour).)

The expression (2) was experimentally derived, and describes that doubled acid normality shortens the shortest time for obtaining the resistant starch-rich starch by a factor of 1/2.2, the longest time by a factor of 1/3, and that elevation of the reaction temperature by 10° C. shortens both of the shortest time and longest time by a factor of 1/4.2.

Since the conditions of production of the resistant starch-rich starch are expressed by three factors of reaction temperature, acid normality and reaction time, so that the expression (2) gives a three-dimensional graph, but may give a two-dimensional chart having the exes of acid normality and reaction time if the reaction temperature is kept constant.

FIG. 6(a) to FIG. 6(c) are drawings illustrating results of examination by the present inventors, made on relations between the acid normality and reaction time, when the temperature was kept constant in the expression (2). Values of the reaction temperature in FIG. 6(a), FIG. 6(b) and FIG. 6(c) are 40° C., 50° C. and 60° C., respectively. Ranges of the acid normality and reaction time, under which the resistant starch-rich starch is producible at the individual temperatures, are indicated by the hatched areas. Explanations of the marks are as follow:

○: resistant starch content≥70%;
●: 70%>resistant starch content≥65%;
■: 65%>resistant starch content≥60%; and
x: 60%>resistant starch content.

Figure 6:
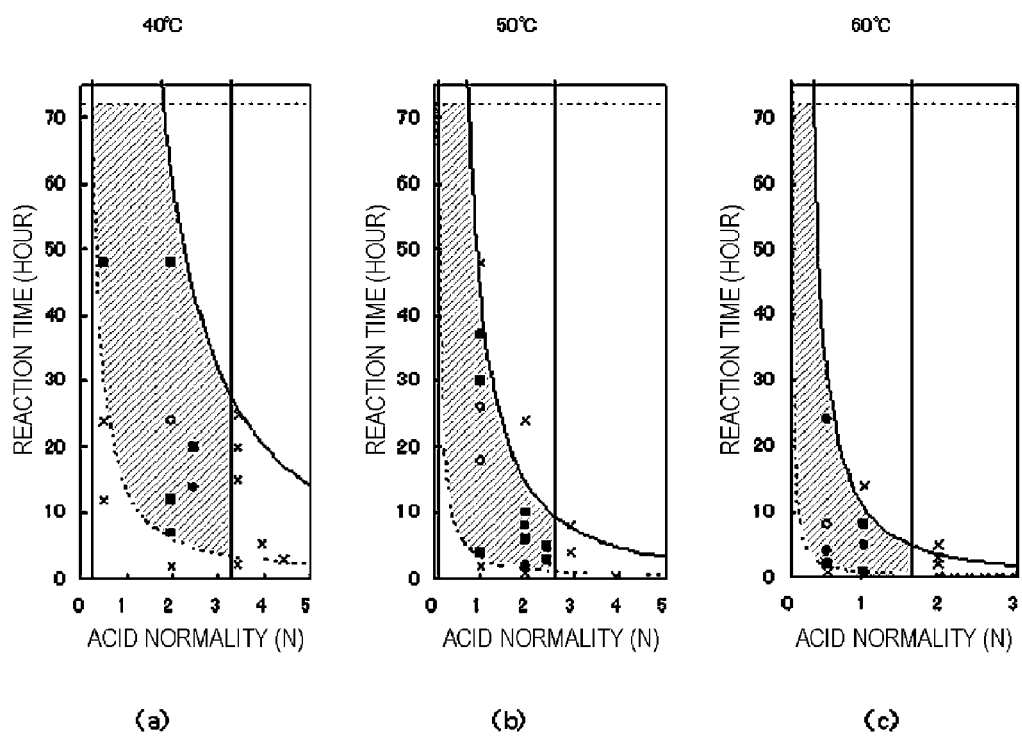
FIG. 6 is a drawing illustrating acid treatment conditions in one embodiment.

The curves in FIG. 6 represent upper limit values and lower limit values of the reaction time calculated by the expression (2) while varying the acid normality. The resistant starch-rich starch may be obtained by proceeding the acid treatment for a duration not shorter than the lower limit values indicated by the broken line, and not longer than the upper limit values indicated by the solid line.

The upper limit and the lower limit of the reaction temperature and the acid normality adopted to the expression (2) are determined by the expression (1). For example, the upper limit and the lower limit of the acid normality determined by the expression (1) are indicated by the vertical solid straight lines in FIG. 6. The upper limit of the reaction time (72 hours in the illustrated examples in FIG. 5 and FIG. 6) is indicated by the horizontal broken line in FIG. 6.

Referring to FIG. 6, it may be understood that the acid treatment, proceeded under the conditions within the hatched area surrounded by the lines, successfully yields the resistant starch-rich starch which satisfies the requirements (a) to (d).

The resistant starch-rich starch may stably be obtained by using amylose-rich starch (high amylose starch) which has an amylose content of 40% or more as a raw material, as a raw material, and by subjecting the raw material to the acid treatment in an aqueous inorganic acid solution under specific conditions.

As described in BACKGROUND ART in the above, there have been known techniques of removing readily digestive fraction from the resistant starch-rich starch, typically by enzyme treatment. These techniques were directed to raise relative ratios of the resistant starch by removing the digestive components, but were not directed to newly produce the resistant starch, nor to increase the absolute amount of resistant starch. While the techniques of proceeding heat-moisture treatment or proceeding acid treatment in an alcoholic solvent were successful in view of newly producing the resistant starch, the amount of increase was not sufficient.

In contrast, in this embodiment, by proceeding the acid treatment using amylose-rich starch which has an amylose content of 40% or more as a raw material, while setting specific conditions respectively for the reaction temperature, the acid normality and the reaction time, the amount of resistant starch content may dramatically be increased. It is also made possible to efficiently increase the absolute amount of resistant starch in high amylose starch.

The thus-obtained resistant starch-rich starch has a large ratio of resistant starch, and is excellent in heat resistance of the resistant starch, so that it may successfully be mixed into various beverages and foods. For example, the resistant starch-rich starch of the present invention may be mixed in beverages and foods, so as to replace with other starches or cereal flours including wheat flour. The resistant starch-rich starch of the present invention causes only a small degree of decrease in the resistant starch content, even after mixed with foods such as bread and noodle, making it possible to provide highly resistant starch-rich foods as compared with the conventional resistant starch-containing starch, even with the same amount of mixing.

Beverages and foods miscible with the resistant starch-rich starch of the present invention are not specifically limited, examples of which may be exemplified by bread including white bread, table roll, sweet bun, deli bread, naan, and Danish pastry;

Western-style confectioneries including sponge cake, pancake, muffin, doughnut, crape, pie, tart, and cookie;

Japanese confectioneries including castella, and manju (sweet bean paste bun);

various confectioneries including rice cracker, arare (cubic rice cracker), snacks, cereal, and cracker;
dough for Chinese snacks including steamed bun, Chinese dumpling, and spring roll;
noodle including udon (Japanese wheat noodle), ramen (Chinese noodle), pasta, and instant noodle; and
batter and breader for fried foods including tempura and fries.

The beverage and food of the present invention contain the resistant starch-rich starch which satisfies the requirements (a) to (d).

According to the present invention, also effects below are now obtainable.

A resistant starch-rich starch typically having a resistant starch content of 60 to 80%, according to the AOAC Official Method 2002.02, may be obtained.

The resistant starch-rich starch mixed in foods (white bread, pancake, udon, for example) keeps high resistant starch content during cooking under heating, causing only a slight decrease in the content. Also texture is less affected, without causing floury texture.

Higher resistant starch content than that obtainable by the conventional techniques, and less decrease in the resistant starch content during cooking, enable provision of resistant starch-rich foods.

None of high temperature exceeding 100° C., high pressure, and large energy are necessary. Since none of expensive enzyme, complicated purification procedures, and retrogradation treatment are necessary, the resistant starch may be supplied at low costs than ever.

The thus-obtained resistant starch-rich starch may further be subjected to predetermined treatment. For example, the resistant starch content may further be increased, by subjecting the resistant starch-rich starch, obtained after the acid treatment, to heat-moisture treatment or enzyme treatment.

EXAMPLES

Examples of the present invention will be explained below, without limiting essential features of the present invention.

The explanation begins with methods of measurement.
(Measurement of Resistant Starch Content According to AOAC Official Method 2002.02)

In the experiments below, the resistant starch content was measured using a resistant starch assay kit (K-RSTAR from Megazyme). Specific procedures are as follow.

In 50 mL of a 100 mM maleic acid buffer (pH6.0, containing 0.028% $CaCl_2$ and 0.02% sodium azide (w/v)), 0.5 g of pancreatin was suspended for 5 minutes, and 0.5 mL of amyloglucosidase solution (300 U/mL) was added. The mixture was centrifuged at 3000 rpm for 10 minutes. Four milliliters of the supernatant was placed in a tube with a cap (from Corning Incorporated, size: 16×125 mm, product number: 430157), containing 100 mg (±5 mg) of the sample (that is, starch-containing material), and the mixture was thoroughly suspended using a vortex mixer. The tube was tightly covered with Parafilm and vinyl tape so as to avoid leakage, placed in a thermostat bath equipped with a shaker, and the content was enzymatically digested at 37° C. for 16 hours, while shaking the tube at a shaking rate of 200 strokes/min in the horizontal direction.

Upon completion of the digestion, 4 mL of 99.5% ethanol was added, the content was thoroughly mixed, centrifuged at 3000 rpm for 10 minutes, and the supernatant was removed. Eight milliliters of 50% ethanol was added to the precipitate in two aliquots so as to re-suspend it, and the suspension was centrifuged again. The operations were repeated once more, and the precipitate, or a resistant starch fraction, was recovered. The tube with cap, containing the precipitate, was dipped in ice water, 2 mL of a 2M KOH solution was added, and the mixture was stirred using a star head stirrer bar for 20 minutes, to thereby completely dissolve the resistant starch fraction. The mixture was neutralized by adding 8 mL of a 1.2M sodium acetate buffer (pH3.8), and was further added with 0.1 mL of amyloglucosidase (3300 U/mL). The mixture was incubated over a water bath at 50° C. for 30 minutes, so as to digest the resistant starch fraction down to glucose. The reaction solution during the incubation was suspended at 5 minute intervals.

The reaction mixture after the amyloglucosidase digestion was centrifuged at 3000 rpm for 10 minutes, and 0.5 mL of the supernatant was diluted with 4.5 mL of distilled water. One-tenth milliliter of the diluted reaction solution was mixed with 3 mL of GOPOD reagent, and the mixture was incubated at 50° C. for 20 minutes. The mixture was cooled down to room temperature, and then subjected to measurement of absorption at 510 nm using a spectrophotometer, so as to quantify the glucose content, referring to a standard sample enclosed in the kit.

The resistant starch content was determined by calculating the amount of starch based on the amount of glucose derived from the resistant starch fraction released by the final amyloglucosidase digestion, and was expressed by weight of resistant starch relative to the dry weight of sample (w/w).
(Measurement of Molecular Weight Distribution)

Molecular weight distribution (molecular weight peak and molecular weight dispersion) was measured using an HPLC unit from Tosoh Corporation (with a pump DP-8020, an RI detector RS-8021, and a degasser SD-8022). Conditions for analysis are as follow:
column: TSKgel α-M (7.8 mmφ, 30 cm) (from Tosoh Corporation)×2;
flow rate: 0.5 ml/min;
moving phase: 5 mM $NaNO_3$/dimethyl sulfoxide:water (9:1);
column temperature: 40° C.; and
sample volume: 0.2 mL (sample concentration 1.0 mg/mL moving phase).

Data from the detector was collected using a dedicated software (multi-station GPC-8020 model II, data collection version 5.70, from Tosoh Corporation), and molecular weight peak and molecular weight dispersion were calculated. A standard curve was prepared using pullulan (from Showa Denko K.K., Shodex Standard P-82) having a known molecular weight.
(Measurement of Gelatinization Enthalpy by DSC)

DSC was conducted using DSC3100 from MAC Science Corporation. Fifteen milligrams of sample and 45 μL of distilled water were placed in a 70-μL aluminum cell, the cell was tightly capped, allowed to stand at room temperature for 3 hours or more, so as to allow the sample to absorb water. A blank cell was used as a reference. The sample was heated from room temperature up to 130° C. at a rate of 10° C./min. Gelatinization enthalpy, measurable based on an area of an endothermic peak in the obtained DSC chart, was defined as heat of gelatinization (J/g) per unit dry weight of starch.
(Measurement of Heat Resistance of Starch)

Figure 7:
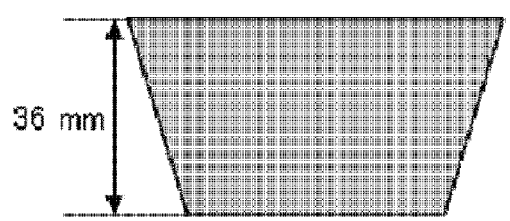
FIG. 7 is a drawing explaining a container used for measurement of heat resistance of resistant starch in EXAMPLES.
Figure 7:
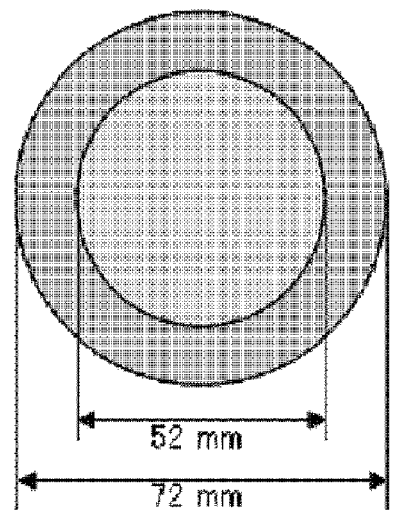

Starch was mixed with water so as to adjust the water content to 30%, and kneaded twice, 3 seconds for each time, using Wonder Brender (from Osaka Chemical Co., Ltd.). The starch adhered on the side faces and the bottom was scraped off using a rubber spatula, and kneaded again for 3 seconds. Six grams of thus moisture-controlled starch was filled in a cup made of stainless steel illustrated in FIG. 7(a) and FIG. 7(b), and the sample was compressed by overlaying thereon a stainless steel cup of the same size and tamped for 10 seconds.

The overlaid stainless steel cup was removed, and the sample was heated in a forced-air-flow thermostat drying oven (EYELA WFO-40) at 200° C. for 20 minutes. The sample after the heating was crushed, sieved through a 60-mesh screen, and the resistant starch content was measured.

Examples 1, 2, Comparative Examples 1, 2

Influence of Amylose Content in Raw Material

High-amylose corn starch HS-7 class VII (from J-Oil Mills, Inc., water content=15.0%, amylose content=80%) was added with water so as to adjust the dry weight of starch relative to the weight of slurry to 40% (dry starch weight/slurry weight), to thereby prepare 320 g of slurry. The slurry was added with 80 mL of an aqueous 6.67N hydrochloric acid solution under stirring, and the temperature was adjusted to 40° C. The normality of hydrochloric acid relative to reaction water including water content of the starch was found to be 1.96N. Time at which the mixture reached a predetermined temperature (40° C. in Example 1) after addition of the aqueous hydrochloric acid solution, was assumed as the start of reaction. After 24 hours of reaction, the mixture was neutralized with 3% NaOH, followed by washing with water, dewatering, drying, to thereby obtain acid-treated, high-amylose corn starch (Example 1). Note that the acid normality hereinafter means acid normality relative to reaction water including water content of the starch in the final reaction liquid, unless otherwise not specifically stated.

Other acid-treated starches were obtained similarly to Example 1 under the same reaction conditions, except for using high-amylose corn starch HS-7 class V (from J-Oil Mills, Inc., amylose content 50%) (Example 2), corn starch Y (from J-Oil Mills, Inc., amylose content 30%) (Comparative Example 1), and waxy corn starch Y (from J-Oil Mills, Inc., amylose content 0%) (Comparative Example 2), respectively in place of high-amylose corn starch HS-7 class VII.

The acid-treated starches in Examples 1, 2, Comparative Examples 1 and 2, and high-amylose corn starch before being acid-treated additionally in Referential Example, were subjected to measurement of resistant starch content, molecular weight peak and molecular weight dispersion by GPC, and gelatinization enthalpy by DSC. Results are shown in Table 1.

TABLE 1

| | Type of starch | Amylose content (%) | RS content (%) Before acid treatment | RS content (%) After acid treatment | Molecular weight peak | Molecular weight dispersion | Gelatinization enthalpy (J/g) | Yield (%) |
|---|---|---|---|---|---|---|---|---|
| Example 1 | HS-7 class VII | 80 | 41 | 72 | $1.2 \times 10^4$ | 4.0 | 4.9 | 94 |
| Example 2 | HS-7 class V | 50 | 49 | 67 | $1.2 \times 10^4$ | 4.7 | 7.1 | 92 |
| Comparative Example 1 | Corn starch Y | 30 | 0.3 | 8.1 | $1.9 \times 10^4$ | 3.9 | 12.2 | 99 |
| Comparative Example 2 | Waxy corn starch Y | 0 | 0.1 | 0.1 | $2.3 \times 10^4$ | 4.4 | 24.1 | 99 |
| Referential Example | Intact HS-7 class VII | | | 41 | $2.2 \times 10^5$ | 8.7 | 15.3 | — |

As is known from Table 1, the resistant starch-rich starches having starch contents of 60% or more were produced from the starches having amylose contents of 50% or more.

Examples 3 to 7, Comparative Examples 3 to 5

Effects of Molecular Weight

Acid-treated starches having various levels of molecular weight peak were obtained by the acid treatment conducted similarly to Example 1, except that the reaction temperature, the reaction time and the inorganic acid normality ("Acid normality (N)" in Table 2) were varied from those in Example 1 (Example 3 to 7, Comparative Example 3 to 5). Results are shown in Table 2.

TABLE 2

| | Acid normality (N) | Reaction temperature (° C.) | Reaction time (hour) | RS content (%) | Molecular weight peak | Molecular weight dispersion | Gelatinization enthalpy (J/g) | Yield (%) |
|---|---|---|---|---|---|---|---|---|
| Comparative Example 3 | 1.96 | 40 | 2 | 47 | $6.2 \times 10^4$ | 7.3 | 15.1 | 97 |
| Example 3 | 1.96 | 40 | 7 | 61 | $3.0 \times 10^4$ | 3.7 | 5.5 | 96 |
| Example 4 | 1.96 | 40 | 12 | 65 | $2.1 \times 10^4$ | 3.5 | 5.6 | 96 |
| Example 1 | 1.96 | 40 | 24 | 72 | $1.2 \times 10^4$ | 4.0 | 4.9 | 94 |
| Example 5 | 1.96 | 40 | 48 | 62 | $8.5 \times 10^3$ | 3.6 | 5.2 | 87 |

TABLE 2-continued

| | Acid normality (N) | Reaction temperature (° C.) | Reaction time (hour) | RS content (%) | Molecular weight peak | Molecular weight dispersion | Gelatinization enthalpy (J/g) | Yield (%) |
|---|---|---|---|---|---|---|---|---|
| Example 6 | 0.49 | 60 | 2 | 62 | $3.6 \times 10^4$ | 5.9 | 8.9 | 100 |
| Example 7 | 0.49 | 60 | 24 | 68 | $6.7 \times 10^3$ | 5.6 | 4.3 | 80 |
| Comparative Example 4 | 0.49 | 40 | 24 | 52 | $5.2 \times 10^4$ | 5.3 | 9.1 | 99 |
| Comparative Example 5 | 1.96 | 50 | 24 | 59 | $5.5 \times 10^3$ | 6.1 | 5.4 | 69 |

Referring to Example 1, Examples 3 to 5 and Comparative Example 3 in Table 2, the molecular weight was found to decrease and the resistant starch content was found to increase, with increase in the reaction time under the same temperature and the same acid normality. On the other hand, the resistant starch content was found to decrease by excessively prolonged acid treatment.

From our further investigations into the acid treatment under more finely varied conditions, as taught by Example 6 and Example 7 in Table 2, starches having resistant starch contents exceeding 60% were obtained by conducting the acid treatment so as to adjust the molecular weight peak to $6 \times 10^3$ or larger and $4 \times 10^4$ or smaller. On the other hand, Comparative Examples 4, 5 were found to give resistant starch content of less than 60%. It is therefore understood that the starches having the resistant starch content increased up to 60% or more may stably be obtained, by adjusting the molecular weight within the range from $6 \times 10^3$ or larger and $4 \times 10^4$ or smaller, by the acid treatment.

Comparative Examples 6 to 8

Comparison with Commercially-Available Resistant Starch-Containing Starch

In these Examples, starches obtained by the methods described in Patent Documents 5 to 7 were evaluated.

Nisshoku Roadster (from Nihon Shokuhin Kako Co., Ltd.) is a product obtained by subjecting high-amylose corn starch to heat-moisture treatment, and is strongly suggested to have been produced by a technique corresponded to the method of manufacturing disclosed in Patent Document 5.

Hi-Maize 1043 (from National Starch and Chemical Company) is a product obtained by subjecting the high-amylose corn starch to heat-moisture treatment, and is strongly suggested to have been produced by a technique corresponded to the method of manufacturing disclosed in Patent Document 6.

ActiStar 11700 (from Cargill, Incorporated) is a recrystallized amylose derived from tapioca starch, and is strongly suggested to have been produced by a technique corresponded to the method of manufacturing disclosed in Patent Document 7.

Now, in order to evaluate the starches obtained by Patent Documents 5 to 7, the resistant starch content, the molecular weight peak and the molecular weight dispersion of these commercially available products were measured (Table 3).

TABLE 3

| | Product name | RS content (%) | Molecular weight peak | Molecular weight dispersion |
|---|---|---|---|---|
| Example 1 | — | 72 | $1.2 \times 10^4$ | 4.0 |
| Comparative Example 6 | Nisshoku Roadster | 41 | $6.2 \times 10^4$ | 10 |
| Comparative Example 7 | Hi-Maize 1043 | 45 | $1.8 \times 10^5$ | 13 |
| Comparative Example 8 | ActiStar 11700 | 50 | $3.0 \times 10^3$ | 5.3 |

Referring to Table 3, all of the commercially available resistant starch-containing starches represented by Comparative Examples 6 to 8 were found to have low levels of resistant starch content.

Comparative Examples 9 to 15

Comparison Using Trial Products

In order to evaluate starches originated from high amylose starch obtainable by the methods described in previous documents, starches were produced on the trial basis according to the methods described in Document 3 (Comparative Example 9), Patent Document 2 (Comparative Example 10), Patent Document 1 (Comparative Example 11, 12), Patent Document 8 (Comparative Example 13), Patent Document 4 (Comparative Example 14), and Patent Document 9 (Comparative Example 15).

Comparative Example 9

Reproduction of Example 4 in Patent Document 3

Twenty grams of high-amylose corn starch HS-7 class VII (from J-Oil Mills, Inc., water content=15%) was added to 34 g of water, the mixture was stirred to prepare a suspension, adjusted to pH7, and then the temperature of which was adjusted to 80° C. Two milliliters of heat-stable α-amylase solution (α-amylase from Micfarm Co., Ltd. (Termamyl 120 L from Novozymes was used herein)) was added to the suspension under stirring, allowed to react at 80° C. for one hour, and then inactivated by adjusting the pH to 3.3 with hydrochloric acid. The suspension was adjusted to pH5.0 with aqueous sodium hydroxide solution, washed with water, dewatered, and dried to thereby obtain 8.8 g of enzyme-digested starch (water content=8.9%). The resistant starch content of the thus-obtained, less-digestive starch was measured, and the molecular weight peak and the molecular weight dispersion were measured by GPC. Results are shown in Table 4.

Comparative Example 10

Reproduction of Example 1 in Patent Document 2

High-amylose corn starch HS-7 class VII (from J-Oil Mills, Inc.) was adjusted to have a water content of 38%, placed in a sealed pack, and heated at 100° C. for 2 hours. The product was dried and crushed, 20 g of the crushed product (water content 9.7%) was then suspended in 440 ml of a 50 mM sodium phosphate buffer (pH 6.9), added with 0.16 g of pancreatin (derived from porcine pancreas, activity equivalent to 8×U.S.P. specifications, product from SIGMA), and the mixture was subjected to enzyme digestion at 37° C. for 8 hours under mild stirring. The mixture was adjusted to pH3.3 with hydrochloric acid to thereby inactivate the enzyme, the sample was filtered, washed, dried, and crushed to thereby obtain 11.0 g of less-digestive starch (water content=9.5%). The resistant starch content of the thus-obtained, less-digestive starch was measured, and the molecular weight peak and the molecular weight dispersion were measured by GPC. Results are shown in Table 4.

TABLE 4

| | RS content (%) | Molecular weight peak | Molecular weight dispersion | Yield (%) |
|---|---|---|---|---|
| Example 1 | 72 | $1.2 \times 10^4$ | 4.0 | 94 |
| Comparative Example 9 | 43 | $9.2 \times 10^3$ | 14 | 47 |
| Comparative Example 10 | 52 | $1.0 \times 10^4$ | 15 | 56 |

Comparative Example 9 was found to be large in the molecular weight dispersion measured by GPC, and small in the resistant starch content measured by the AOAC Official Method 2002.02.

Also Comparative Example 10 was found to be large in the molecular weight dispersion measured by GPC, and small in the resistant starch content.

Comparative Example 11

Reproduction of Example 5 in Patent Document 1

One hundred grams of high-amylose corn starch HS-7 class VII (from J-Oil Mills, Inc., water content=15.0%) was suspended in 100 ml of ethanol, added with 10 ml of concentrated hydrochloric acid, and the mixture was allowed to stand at room temperature (22° C. or around) for 3 days, with occasional stirring. The acid-treated starch was collected by suction filtration, suspended in 70% ethanol, and suction-filtered again. This way of washing was repeated until pH of the filtrate exceeds 5.0. Thereafter, the collected matter was dried and crushed, to thereby obtain 92.4 g of acid-treated starch (water content 12.1%). The resistant starch content of the thus-obtained sample was measured, and the molecular weight peak and the molecular weight dispersion were measured by GPC. Results are shown in Table 5.

TABLE 5

| | RS content (%) | Molecular weight peak | Molecular weight dispersion | Yield (%) |
|---|---|---|---|---|
| Example 1 | 72 | $1.2 \times 10^4$ | 4.0 | 94 |
| Comparative Example 11 | 45 | $5.2 \times 10^4$ | 8.3 | 96 |

Comparative Example 11 was found to be different from the present invention, in the molecular weight peak and the molecular weight dispersion measured by GPC, and also lower in the resistant starch content measured by the AOAC Official Method 2002.02.

Comparative Example 12

In order to compare Patent Document 1 and Example 1 in further detail, the acid treatment was proceeded according to the conditions below, to thereby obtain the acid-treated starch which satisfy the requirements (b) and (c).

First, 50 g of high amylose starch HS-7 class VII (from J-Oil Mills, Inc., water content=15.0%) was suspended in 200 ml of ethanol, and added and mixed with 8 ml of concentrated hydrochloric acid. The mixture was acid-treated at 40° C. for 24 hours under stirring, and then filtered, washed, dried and crushed similarly as described in Comparative Example 11, to thereby obtain 46.7 g of acid-treated starch (water content=10.9%). The resistant starch content of the thus-obtained sample was measured, and the molecular weight peak and the molecular weight dispersion were measured by GPC. Results are shown in Table 6.

TABLE 6

| | RS content (%) | Molecular weight peak | Molecular weight dispersion | Yield (%) |
|---|---|---|---|---|
| Example 1 | 72 | $1.2 \times 10^4$ | 4.0 | 94 |
| Comparative Example 12 | 54 | $2.2 \times 10^4$ | 3.9 | 97 |

While the acid-treated starch obtained in Comparative Example 12 was found to satisfy the requirements (b) and (c), the resistant starch content was only as low as 54%. By the acid treatment in the ethanol-based solvent, a processed starch having a resistant starch content exceeding 60% could not be obtained, even if the acid treatment was proceeded under conditions adjusted so as to achieve the molecular weight peak and the molecular weight dispersion denoted by the requirements (b) and (c).

Comparative Example 13

Reproduction of Example 8 in Patent Document 8

Fifteen grams of high-amylose corn starch HS-7 class VII (from J-Oil Mills, Inc., water content=15.0%) was suspended in 40 ml of water, and then added with 260 ml of boiling water to thereby prepare a uniform slurry. The slurry was heated in an autoclave at 121° C. for 8 hours, and then kept at 24° C. for 16 hours, and further at 8° C. for 48 hours. The product was centrifuged, and the collected precipitate fraction was added and suspended with water to obtain a 10% slurry. One gram of *Bacillus subtilis* α-amylase (from Wako Pure Chemical Industries, Ltd.) was suspended in 19 ml of cold water, allowed to stand for 2 hours, and centrifuged to collect the supernatant. Separately, 500 U of human saliva amylase (TYPE IX-A, from SIGMA) was dissolved in 20 ml of cold water. To the 10% starch slurry after heating and cooling, 15 ml of the *Bacillus subtilis* α-amylase solution and 20 ml of the human saliva amylase solution were added, and the enzyme treatment was allowed to proceed at 24° C. for 25 hours. The enzyme-treated starch was collected by centrifugation, re-suspended with the equal volume of water, and the suspension was centrifuged again to collect the precipitate. These operations were repeated three times, and the precipitate fraction was lyophilized to obtain 8.1 g of trial product (water content=11.4%). The resistant starch content of the thus-obtained sample was measured, and the molecular weight peak and the molecular weight dispersion were measured by GPC. Results are shown in Table 7.

TABLE 7

|  | RS content (%) | Molecular weight peak | Molecular weight dispersion | Yield (%) |
|---|---|---|---|---|
| Example 1 | 72 | $1.2 \times 10^4$ | 4.0 | 94 |
| Comparative Example 13 | 56 | $9.0 \times 10^3$ | 3.4 | 57 |

As is clear from Table 7, the resistant starch content of the trial product obtained in Comparative Example 13 was not found to satisfy the requirement (a).

Comparative Example 14

Reproduction of Patent Document 4

According to the method described in Patent Document 4, a trial product was prepared. First, 9.41 g of high amylose starch HS-7 class VII (from J-Oil Mills, Inc., water content=15.0%) was suspended in a solvent composed of 90.6 ml of water, 95 ml of ethanol, and 5 ml of methanol. In each of six stainless steel reaction tubes, 12.2 g each of the obtained slurry was placed, and the air in the tube was replaced with nitrogen gas. The reaction tube herein is configured by a stainless steel pipe (inner diameter=16.0 mm, outer diameter=19.3 mm, length=150 mm), and stainless steel caps (SS-1210-C, from Swagelok Company) attached to both ends thereof. The reaction tubes containing the sample were heated over a salt bath at 150° C. for 1 hour, under continuous shaking. The reaction tubes were taken out from the salt bath, transferred to a water bath at 40° C., and kept 2 hours under continuous shaking. The reaction tubes were transferred to a salt bath at 145° C., and kept for 3 hours under continuous shaking. The reaction tubes were transferred to a water bath at 80° C., and kept for 1 hour under continuous shaking. Thereafter, the water bath was turned off, and the reaction tubes were cooled overnight over the bath. The samples were taken out from the reaction tubes, and the precipitates were collected by suction filtration. The precipitate was dried overnight in a forced-air-flow drying oven at 30° C. The dried precipitates were crushed, the thus-obtained samples were conditioned to have a water content of 25.8%, and kept in an autoclave at 120° C. for 120 minutes. The samples were then dried overnight at 50° C., and crushed, to thereby obtain 6.19 g of trial product (water content 12.5%). The resistant starch content of the thus-obtained sample was measured, and the molecular weight peak and the molecular weight dispersion were measured by GPC. Results are shown in Table 8.

TABLE 8

|  | RS content (%) | Molecular weight peak | Molecular weight dispersion | Yield (%) |
|---|---|---|---|---|
| Example 1 | 72 | $1.2 \times 10^4$ | 4.0 | 94 |
| Comparative Example 14 | 62 | $3.0 \times 10^4$ | 9.0 | 92 |

As is clear from Table 8, the molecular weight dispersion of the trial product obtained in Comparative Example 14 was not found to satisfy the requirement (c).

Comparative Example 15

Reproduction of Patent Document 9

In order to investigate difference between the present invention and Patent Document 9, a trial product was prepared according to the method described in the document. First, 100 g of high amylose starch HS-7 class VII (from J-Oil Mills, Inc., water content=15.0%) was suspended in 400 ml of water, to thereby prepare a starch slurry. In each of 15 stainless-steel reaction tubes similar to those used in Comparative Example 14, 22.1 g each of the slurry was placed. The reaction tubes containing the starch slurry were dipped in a salt bath at 210° C. for 130 seconds, taken out, and then immediately cooled with water. The reaction liquid was thoroughly washed out from the reaction tubes, and the precipitate was collected by centrifugation (3000 rpm, 10 minutes). The precipitate was added with doubled volume of water to re-suspend therein, and the suspension was centrifuged again to collect the precipitate. The precipitate was dried under reduced pressure, and crushed, to thereby obtain 31.2 g in total of trial product (water content=18.7%). The resistant starch content of the thus-obtained sample was measured, and the molecular weight peak and the molecular weight dispersion were measured by GPC, and the gelatinization enthalpy was measured. Results are shown in Table 9.

TABLE 9

|  | RS content (%) | Molecular weight peak | Molecular weight dispersion | Gelatinization enthalpy (J/g) | Yield (%) |
|---|---|---|---|---|---|
| Example 1 | 72 | $1.2 \times 10^4$ | 4.0 | 4.9 | 94 |
| Comparative Example 15 | 73 | $9.5 \times 10^3$ | 5.3 | 16 | 45 |

As is clear from Table 9, the gelatinization enthalpy of the trial product obtained in Comparative Example 15 was not found to satisfy the requirement (d).

(Measurement of Resistant Starch Content after Heating)

In order to measure the resistant starch contents, after the heating, of the resistant starch-rich starch obtained by the method of Example 1, the high-amylose corn starch of Referential Example, and the starches described in Comparative Example 6 (Nisshoku Roadster), Comparative Example 8 (ActiStar 11700), Comparative Example 15 (Patent Document 9), Comparative Example 10 (Patent Document 2), and Comparative Example 12 (Patent Document 1), heating test was conducted assuming a cookie making process.

Six grams of each starch, moisture-controlled according to the above-described method of measuring the heat resistance of resistant starch, was heated at 200° C. for 20 minutes. Each sample after the heating was crushed, sieved through a 60-mesh screen, and the resistant starch content was measured (Table 10).

As is clear from Table 10, the resistant starch contents, before and after the heating, of all of processed starch obtained in Comparative Examples 6, 8, 10, 12 and the high-amylose corn starch in the Referential Example, were found to be less than 60%. The processed starch in Comparative Example 15 was found to be high in the resistant starch content before the heating, but the resistant starch content decreased down to 43% after the heating. This is supposedly because the processed starch of Comparative Example 15 did not satisfy the requirement (d), indicating low heat resistance. It is therefore understood that the resistant starch-rich starch in Example 1 was found to be high in the resistant starch content after the heating as compared with the high-amylose corn starch in Referential Example, and the processed starches in Comparative Examples 6, 8, 10, 12 and 15.

TABLE 10

|  | RS content before heating (%) | RS content after heating (%) |
|---|---|---|
| Example 1 | 72 | 70 |
| Referential Example | 41 | 28 |
| Comparative Example 6 | 41 | 43 |
| Comparative Example 8 | 50 | 40 |
| Comparative Example 10 | 52 | 56 |
| Comparative Example 12 | 54 | 45 |
| Comparative Example 15 | 73 | 43 |

(Changes in Amount of Resistant Starch by Processing Methods)

The sample obtained in Example 1 and the trial products obtained in Comparative Examples 9 to 15 were examined with respect to changes in the absolute amounts of the resistant starch before and after the processing. Results are shown in Table 11. In Table 11, RS yield is given by the equation below:

[RS yield](%)=([Dry weight of product]×[RS content of product])÷([Dry weight of raw material]×[RS content of raw material])×100.

As is clear from Table 11, the starch of Example 1, obtained by processing the starch with the aqueous inorganic acid solution was found to show a large increase in the absolute amount of resistant starch, as compared with the starches obtained by the methods of Comparative Examples. Unlike the most of the conventional methods which were directed to raise the content of resistant starch by removing the portions other than the resistant starch, the Example 1 successfully raised the content of resistant starch by producing the resistant starch per se.

TABLE 11

|  |  | Example 1 | Comp. Example 9 | Comp. Example 10 | Comp. Example 11 | Comp. Example 12 | Comp. Example 13 | Comp. Example 14 | Comp. Example 15 |
|---|---|---|---|---|---|---|---|---|---|
| Raw material | Dry weight (g) | 128 | 17 | 18 | 85 | 43 | 13 | 6.5 | 56.4 |
|  | RS content (%) | 41 | 41 | 41 | 41 | 41 | 41 | 41 | 41 |
| Product | Dry weight (g) | 120 | 8.0 | 10 | 81.2 | 41.6 | 7.2 | 6.0 | 25.4 |
|  | RS content (%) | 72 | 43 | 52 | 45 | 55 | 56 | 62 | 73 |
| Rs yield (%) *1 |  | 165 | 49 | 70 | 105 | 130 | 76 | 140 | 80 |

[RS yield] (%) = ([Dry weight of product] × [RS content of product]) ÷ ([Dry weight of raw material] × [RS content of raw material]) × 100

(Conditions of Production of Resistant Starch-Rich Starch)

Acid treatment was conducted under conditions of acid normality and temperature changed from those in Example 1 into those listed in Table 12 to Table 18, fractions of the individual reaction liquids were taken out at the individual reaction time listed in Table 12 to Table 18, followed by filtration, washing, drying and crushing, to thereby obtain acid-treated starches. The samples were subjected to measurement of resistant starch content, molecular weight peak and molecular weight dispersion by GPC, and gelatinization enthalpy by DSC. Results are shown in Table 12 to Table 18.

For the condition under which the inorganic acid normality of the reaction liquid exceeds 2.5N, the reaction liquid for acid treatment was prepared by the method described below. First, taking the water content of high-amylose corn starch used as the raw material into consideration, an aqueous hydrochloric acid solution was prepared so as to finally obtain total 400 g of 32% starch slurry having a desired acid normality. To the mixture, the high-amylose corn starch same as that used in Example 1 was added to obtain a suspension, and heating at a predetermined temperature was started. The processes thereafter for preparing the samples are similar to those described in Example 1.

(Explanation of Table 12 to Table 18)

Calculated reaction time denoted in Tables is given by the lower limit and the upper limit calculated by the expression (2) in the above, at which the resistant starch-rich starch having a resistant starch content of 60% or more may be obtained at the acid normality and temperature listed in Tables. In other words, the reaction time at which the resistant starch content starts to exceed 60% is denoted as "lower limit", and the reaction time at which the resistant starch content starts to fall below 60% is denoted as "upper limit".

In Table 12 to Table 18, and also in Table 19 and Table 20 described later, as for the item of "Within range of requirement (a)?", those satisfy the requirement (a) were denoted by "○", and those do not satisfy it were denoted by "x".

Table 12 to Table 14 show results of acid treatment conducted at the acid normality and temperature which fall in the range given by the expression (1) in the above (conditions denoted by "○" in FIG. 5) (Test Examples 1-9). The samples were found to have the resistant starch contents exceeding 60% when prepared under the reaction time between the upper limit and the lower limit calculated by the expression (2), but were found to have the resistant starch contents of smaller than 60% when prepared under the reaction time not shorter than the upper limit or not longer than the lower limit. It was also confirmed that all of the resistant starch-rich starches having resistant starch contents of 60% or more had molecular weight peaks of $6\times10^3$ or larger and $4\times10^4$ or smaller, values of molecular weight dispersion of 1.5 or larger and 6.0 or smaller, and values of gelatinization enthalpy of 10 J/g or smaller.

Table 15 to Table 17 show results of the acid treatment conducted at the reaction temperature and acid normality which fall out of the range given by the expression (1) towards the higher temperature/higher acid concentration side (conditions denoted by "x" in FIG. 5) (Test Examples 10-17). Under these conditions, starches having resistant starch contents exceeding 60% were not obtained, even if the reaction time was varied in the range from 0 hour to 3 days.

Table 18 shows results of the acid treatment conducted at the reaction temperature and acid normality which fall out of the range given by the expression (1) towards the lower temperature/lower acid concentration side (Test Examples 18-20). Under these conditions, the resistant starch content was found to increase with the elapse of reaction time, but the reaction took long times, and failed to give the resistant starch-rich starch within 3 days.

TABLE 12

| Test Example 1 |  | Calculated reaction time |  |
|---|---|---|---|
| Temperature (° C.) | 40 | Lower limit (hour) | 29.3 |
| Acid normality (N) | 0.490 | Upper limit (hour) | 555 |

TABLE 12-continued

| Reaction time (hour) | RS content (%) | Within range of requirement (a)? | Molecular weight peak | Molecular weight dispersion | Gelatinization enthalpy (J/g) |
|---|---|---|---|---|---|
| 24 | 51.6 | x | $5.2 \times 10^4$ | 5.3 | 9.1 |
| 48 | 60.7 | ○ | $3.3 \times 10^4$ | 3.8 | 5.7 |
| 168 | 68.7 | ○ | $1.5 \times 10^4$ | 4.0 | 5.9 |

| Test Example 2 | | Calculated reaction time | |
|---|---|---|---|
| Temperature (° C.) | 40 | Lower limit (hour) | 6.03 |
| Acid normality (N) | 1.96 | Upper limit (hour) | 62.1 |

| Reaction time (hour) | RS content (%) | Within range of requirement (a)? | Molecular weight peak | Molecular weight dispersion | Gelatinization enthalpy (J/g) |
|---|---|---|---|---|---|
| 2 | 46.9 | x | $6.2 \times 10^4$ | 7.3 | 15.1 |
| 7 | 60.7 | ○ | $3.0 \times 10^4$ | 3.7 | 5.5 |
| 24 | 72.4 | ○ | $1.2 \times 10^4$ | 4.0 | 4.9 |
| 48 | 62.1 | ○ | $8.5 \times 10^3$ | 3.6 | 5.2 |
| 96 | 53.4 | x | $7.0 \times 10^3$ | 3.8 | 6.1 |

| Test Example 3 | | Calculated reaction time | |
|---|---|---|---|
| Temperature (° C.) | 40 | Lower limit (hour) | 4.68 |
| Acid normality (N) | 2.45 | Upper limit (hour) | 43.7 |

| Reaction time (hour) | RS content (%) | Within range of requirement (a)? | Molecular weight peak | Molecular weight dispersion | Gelatinization enthalpy (J/g) |
|---|---|---|---|---|---|
| 14 | 69.9 | ○ | $1.1 \times 10^4$ | 4.0 | 4.5 |
| 20 | 64.0 | ○ | $9.0 \times 10^3$ | 3.2 | 4.9 |

TABLE 13

| Test Example 4 | | Calculated reaction time | |
|---|---|---|---|
| Temperature (° C.) | 30 | Lower limit (hour) | 25.4 |
| Acid normality (N) | 1.96 | Upper limit (hour) | 261 |

| Reaction time (hour) | RS content (%) | Within range of requirement (a)? | Molecular weight peak | Molecular weight dispersion | Gelatinization enthalpy (J/g) |
|---|---|---|---|---|---|
| 89 | 64.8 | ○ | $1.3 \times 10^4$ | 4.1 | 4.1 |

| Test Example 5 | | Calculated reaction time | |
|---|---|---|---|
| Temperature (° C.) | 50 | Lower limit (hour) | 3.17 |
| Acid normality (N) | 0.980 | Upper limit (hour) | 44.2 |

| Reaction time (hour) | RS content (%) | Within range of requirement (a)? | Molecular weight peak | Molecular weight dispersion | Gelatinization enthalpy (J/g) |
|---|---|---|---|---|---|
| 3 | 59.8 | x | $3.7 \times 10^4$ | 6.1 | 6.9 |
| 4 | 64.8 | ○ | $3.0 \times 10^4$ | 5.8 | 5.3 |
| 18 | 72.0 | ○ | $9.9 \times 10^3$ | 4.3 | 4.9 |
| 26 | 70.1 | ○ | $7.4 \times 10^3$ | 3.8 | 5.5 |
| 37 | 61.8 | ○ | $6.8 \times 10^3$ | 4.6 | 4.8 |
| 48 | 49.9 | x | $6.1 \times 10^3$ | 4.4 | 3.3 |

| Test Example 6 | | Calculated reaction time | |
|---|---|---|---|
| Temperature (° C.) | 50 | Lower limit (hour) | 1.44 |
| Acid normality (N) | 1.96 | Upper limit (hour) | 14.8 |

TABLE 13-continued

| Reaction time (hour) | RS content (%) | Within range of requirement (a)? | Molecular weight peak | Molecular weight dispersion | Gelatinization enthalpy (J/g) |
|---|---|---|---|---|---|
| 1 | 55.3 | x | $3.7 \times 10^4$ | 6.1 | 7.7 |
| 1.5 | 61.7 | ○ | $2.8 \times 10^4$ | 5.2 | 6.7 |
| 8 | 66.3 | ○ | $8.1 \times 10^3$ | 4.1 | 5.6 |
| 10 | 60.2 | ○ | $7.4 \times 10^3$ | 4.2 | 5.0 |
| 24 | 58.7 | x | $5.5 \times 10^3$ | 6.1 | 5.4 |

TABLE 14

| Test Example 7 | | Calculated reaction time | |
|---|---|---|---|
| Temperature (° C.) | 50 | Lower limit (hour) | 1.11 |
| Acid normality (N) | 2.45 | Upper limit (hour) | 10.4 |

| Reaction time (hour) | RS content (%) | Within range of requirement (a)? | Molecular weight peak | Molecular weight dispersion | Gelatinization enthalpy (J/g) |
|---|---|---|---|---|---|
| 3 | 63.4 | ○ | $1.2 \times 10^4$ | 4.6 | 5.2 |
| 5 | 65.7 | ○ | $9.0 \times 10^3$ | 3.5 | 5.6 |

| Test Example 8 | | Calculated reaction time | |
|---|---|---|---|
| Temperature (° C.) | 60 | Lower limit (hour) | 1.66 |
| Acid normality (N) | 0.490 | Upper limit (hour) | 31.5 |

| Reaction time (hour) | RS content (%) | Within range of requirement (a)? | Molecular weight peak | Molecular weight dispersion | Gelatinization enthalpy (J/g) |
|---|---|---|---|---|---|
| 1 | 49.2 | x | $4.9 \times 10^4$ | 9.9 | 13.0 |
| 2 | 62.2 | ○ | $3.6 \times 10^4$ | 5.9 | 8.9 |
| 4 | 69.4 | ○ | $2.1 \times 10^4$ | 4.6 | 6.4 |
| 8 | 73.9 | ○ | $1.3 \times 10^4$ | 4.0 | 6.2 |
| 24 | 68.1 | ○ | $6.7 \times 10^3$ | 5.6 | 4.3 |
| 40 | 56.7 | x | $6.1 \times 10^3$ | 6.4 | 4.7 |

| Test Example 9 | | Calculated reaction time | |
|---|---|---|---|
| Temperature (° C.) | 60 | Lower limit (hour) | 0.75 |
| Acid normality (N) | 0.980 | Upper limit (hour) | 10.5 |

| Reaction time (hour) | RS content (%) | Within range of requirement (a)? | Molecular weight peak | Molecular weight dispersion | Gelatinization enthalpy (J/g) |
|---|---|---|---|---|---|
| 0.5 | 51.2 | x | $4.4 \times 10^4$ | 6.8 | 7.6 |
| 1 | 60.5 | ○ | $2.8 \times 10^4$ | 4.8 | 6.6 |
| 2 | 64.9 | ○ | $1.8 \times 10^4$ | 4.3 | 7.1 |
| 8 | 61.1 | ○ | $6.8 \times 10^3$ | 3.6 | 6.4 |
| 14 | 51.8 | x | $6.1 \times 10^3$ | 4.5 | 6.0 |

TABLE 15

| Test Example 10 | |
|---|---|
| Temperature (° C.) | 40 |
| Acid normality (N) | 3.43 |

| Calculated reaction time | |
|---|---|
| Lower limit (hour) | 3.19 |
| Upper limit (hour) | 25.7 |

TABLE 15-continued

| Reaction time (hour) | RS content (%) | Within range of requirement (a)? |
|---|---|---|
| 2.25 | 56.8 | x |
| 4 | 58.8 | x |
| 8 | 56.8 | x |
| 15 | 55 | x |
| 20 | 48.5 | x |
| 25 | 52.3 | x |

Test Example 11

| | |
|---|---|
| Temperature (° C.) | 60 |
| Acid normality (N) | 1.96 |

Calculated reaction time

| | |
|---|---|
| Lower limit (hour) | 0.34 |
| Upper limit (hour) | 3.52 |

| Reaction time (hour) | RS content (%) | Within range of requirement (a)? |
|---|---|---|
| 2 | 59 | x |
| 3 | 57.9 | x |
| 4 | 58.7 | x |
| 5 | 58 | x |

Test Example 12

| | |
|---|---|
| Temperature (° C.) | 70 |
| Acid normality (N) | 0.245 |

Calculated reaction time

| | |
|---|---|
| Lower limit (hour) | 0.87 |
| Upper limit (hour) | 22.4 |

| Reaction time (hour) | RS content (%) | Within range of requirement (a)? |
|---|---|---|
| 0.5 | 40.6 | x |
| 1 | 48.5 | x |
| 2 | 49.5 | x |
| 4 | 57.1 | x |
| 6 | 58.5 | x |
| 15 | 58.3 | x |

TABLE 16

Test Example 13

| | |
|---|---|
| Temperature (° C.) | 30 |
| Acid normality (N) | 4.41 |

Calculated reaction time

| | |
|---|---|
| Lower limit (hour) | 10.1 |
| Upper limit (hour) | 72.5 |

| Reaction time (hour) | RS content (%) | Within range of requirement (a)? |
|---|---|---|
| 14 | 47.4 | x |
| 17 | 40.3 | x |
| 20 | 39.9 | x |

Test Example 14

| | |
|---|---|
| Temperature (° C.) | 40 |
| Acid normality (N) | 3.92 |

TABLE 16-continued

Calculated reaction time

| | |
|---|---|
| Lower limit (hour) | 2.74 |
| Upper limit (hour) | 20.8 |

| Reaction time (hour) | RS content (%) | Within range of requirement (a)? |
|---|---|---|
| 5.5 | 49.3 | x |

Test Example 15

| | |
|---|---|
| Temperature (° C.) | 50 |
| Acid normality (N) | 2.94 |

Calculated reaction time

| | |
|---|---|
| Lower limit (hour) | 0.9 |
| Upper limit (hour) | 7.79 |

| Reaction time (hour) | RS content (%) | Within range of requirement (a)? |
|---|---|---|
| 0.5 | 52.6 | x |
| 1 | 55 | x |
| 2 | 52.2 | x |
| 4 | 58.1 | x |
| 6 | 53.7 | x |
| 8 | 51.8 | x |

TABLE 17

Test Example 16

| | |
|---|---|
| Temperature (° C.) | 70 |
| Acid normality (N) | 0.49 |

Calculated reaction time

| | |
|---|---|
| Lower limit (hour) | 0.4 |
| Upper limit (hour) | 7.49 |

| Reaction time (hour) | RS content (%) | Within range of requirement (a)? |
|---|---|---|
| 0.33 | 44 | x |
| 0.67 | 49.8 | x |
| 1 | 53.5 | x |
| 1.5 | 57 | x |
| 2 | 56.4 | x |
| 3 | 56.7 | x |

Test Example 17

| | |
|---|---|
| Temperature (° C.) | 80 |
| Acid normality (N) | 0.2 |

Calculated reaction time

| | |
|---|---|
| Lower limit (hour) | 0.27 |
| Upper limit (hour) | 7.59 |

| Reaction time (hour) | RS content (%) | Within range of requirement (a)? |
|---|---|---|
| 2 | 53 | x |
| 4 | 51.6 | x |
| 6 | 59.1 | x |

TABLE 18

Test Example 18

| Temperature (° C.) | 20 |
|---|---|
| Acid normality (N) | 1.96 |

Calculated reaction time

| Lower limit (hour) | 106 |
|---|---|

| Reaction time (hour) | RS content (%) | Within range of requirement (a)? |
|---|---|---|
| 72 | 45.9 | x |

Test Example 19

| Temperature (° C.) | 30 |
|---|---|
| Acid normality (N) | 0.49 |

Calculated reaction time

| Lower limit (hour) | 123 |
|---|---|

| Reaction time (hour) | RS content (%) | Within range of requirement (a)? |
|---|---|---|
| 72 | 41.7 | x |

Test Example 20

| Temperature (° C.) | 40 |
|---|---|
| Acid normality (N) | 0.098 |

Calculated reaction time

| Lower limit (hour) | 184 |
|---|---|

| Reaction time (hour) | RS content (%) | Within range of requirement (a)? |
|---|---|---|
| 96 | 45.7 | x |
| 168 | 51.2 | x |

(Acid Treatment Using Sulfuric Acid)

While Example 1 adopted hydrochloric acid as an acid catalyst, the acid-treated starch herein was obtained similarly as described in Example 1, except that sulfuric acid was used in place of hydrochloric acid, at acid normality, temperature and reaction time listed in Table 19. Results are shown in Table 19.

As is clear from Table 19, the resistant starch-rich starch having a resistant starch content exceeding 60% was successfully produced, also by using sulfuric acid.

TABLE 19

Test Example 21

| Acid | Sulfuric acid |
|---|---|
| Temperature (° C.) | 50 |
| Acid normality (N) | 0.97 |

| Reaction time (hour) | RS content (%) | Within range of requirement (a)? | Molecular weight peak | Molecular weight dispersion | Gelatinization enthalpy (J/g) |
|---|---|---|---|---|---|
| 18 | 67.2 | ○ | $2.2 \times 10^4$ | 4.9 | 7.9 |

(Exemplary Cases which Satisfy Requirements (b), (c) and (d), but not (a))

The acid treatment was conducted according to the method described in Example 1, except for adopting the acid normality, temperature and time listed in Table 20 (Test Examples 22-24). These conditions fall out of the range given by the expression (1) which determines the conditions for producing the resistant starch-rich starch, towards higher temperature/higher acid concentration side. The resistant starch content, molecular weight peak, the molecular weight dispersion, and the gelatinization enthalpy of these samples were measured.

TABLE 20

| Test Example 22 | | Calculated reaction time | |
|---|---|---|---|
| Temperature (° C.) | 60 | Lower limit (hour) | 0.34 |
| Acid normality (N) | 1.96 | Upper limit (hour) | 3.52 |

| Reaction time (hour) | RS content (%) | Within range of requirement (a)? | Molecular weight peak | Molecular weight dispersion | Gelatinization enthalpy (J/g) |
|---|---|---|---|---|---|
| 2 | 57.4 | x | $8.7 \times 10^3$ | 4.9 | 4.1 |

| Test Example 23 | | Calculated reaction time | |
|---|---|---|---|
| Temperature (° C.) | 70 | Lower limit (hour) | 0.87 |
| Acid normality (N) | 0.25 | Upper limit (hour) | 22.42 |

| Reaction time (hour) | RS content (%) | Within range of requirement (a)? | Molecular weight peak | Molecular weight dispersion | Gelatinization enthalpy (J/g) |
|---|---|---|---|---|---|
| 2 | 56.4 | x | $1.3 \times 10^4$ | 4.4 | 3.8 |

| Test Example 24 | | Calculated reaction time | |
|---|---|---|---|
| Temperature (° C.) | 80 | Lower limit (hour) | 0.59 |
| Acid normality (N) | 0.098 | Upper limit (hour) | 22.71 |

| Reaction time (hour) | RS content (%) | Within range of requirement (a)? | Molecular weight peak | Molecular weight dispersion | Gelatinization enthalpy (J/g) |
|---|---|---|---|---|---|
| 5 | 47.2 | x | $1.1 \times 10^4$ | 3.7 | 4.1 |

As is clear from Table 20, these samples satisfy the requirements (b), (c) and (d), but do not satisfy (a). It is therefore understood that, in order to obtain the resistant starch-rich starches which satisfy the requirements (a) to (d), it is necessary to conduct the acid treatment within specific ranges of temperature and acid normality.

Foods Mixed with Resistant Starch-Rich Starch

Example 8

Production of Bread Mixed with Resistant Starch-Rich Starch

White bread mixed with the resistant starch-rich starch obtained by the method described in Example 1 was obtained according to the ratio and method listed in Table 21.

Comparative Example 16

Production of Bread Mixed with Intact High-Amylose Corn Starch

Bread mixed with an intact high-amylose corn starch was produced similarly as described in Example 8, except that the intact high-amylose corn starch exemplified in Referential Example was used, in place of the resistant starch-rich starch obtained by the method described in Example 1.

(Control 1) (Production of Bread not Mixed with Starch)

Bread not mixed with starch was produced similarly as described in Example 8, except that strong flour was used, in place of the resistant starch-rich starch obtained by the method described in Example 1.

TABLE 21

|  | Mixing ratio (parts by weight) | | |
| --- | --- | --- | --- |
|  | Control 1 | Example 8 | Comparative Example 16 |
| Mixing of sponge dough | | | |
| bread flour | 70 | 70 | 70 |
| Emulsifier | 0.3 | 0.3 | 0.3 |
| Yeast food | 0.1 | 0.1 | 0.1 |
| Raw yeast | 2 | 2 | 2 |
| Water | 40 | 40 | 40 |
| Mixing of final dough | | | |
| bread flour | 30 | 10 | 10 |
| Resistant starch-rich starch obtained by method of Example 1 | — | 20 | — |
| High amylose corn starch of Referential Example | — | — | 20 |
| sugar | 5 | 5 | 5 |
| Table salt | 2 | 2 | 2 |
| Shortening | 6 | 6 | 6 |
| Skimmed milk | 2 | 2 | 2 |
| Water | 26 | 26 | 26 |
| Total | 183.4 | 183.4 | 183.4 |
| Sponge dough process | | | |
| Mixing | L3M1 | | |
| Temperature after kneading | 24° C. | | |
| Fermentation | 24° C., 4 hours | | |
| Final mixing | | | |
| Mixing | L3M2H1↓L2M2H4 | | |
| Temperature after kneading | 28° C. | | |
| Floor time | 30 minutes | | |
| Dividing | 220 g | | |
| Bench time | 20 minutes | | |
| Final proof | 38° C., 80%, 55 minutes | | |
| Baking | top heat 190° C., bottom heat 220° C., 50 minutes | | |

Each of the breads obtained in Example 8, Comparative Example 16 and Control 1 was crushed using a food processor, and dried overnight under air flow at 40° C. Each sample was further crushed using a mill, sieved through a 60-mesh screen, and the resistant starch content of which was measured by the AOAC Official Method 2002.02. Results are shown in Table 22. RS contents of bread before baking and after baking are obtained by subtracting the RS content ascribable to wheat flour measured in Control 1. In Table 22, and also in Table 24 and Table 26 described later, residual ratio of resistant starch after baking (boiling) is calculated by [RS content after baking (boiling)]/[RS content before baking (boiling)]×100 (weight ratio).

TABLE 22

|  | RS content before baking (%) | RS content after baking (%) | Residual ratio of RS after baking (%) |
| --- | --- | --- | --- |
| Example 8 | 12.8 | 13.8 | 108 |
| Comparative Example 16 | 7.1 | 5.9 | 83 |

As is clear from Table 22, the bread mixed with the resistant starch-rich starch obtained by the method described in Example 1 (Example 8) was not found to decrease in the resistant starch content even after baking, proving that the bread having a larger resistant starch content, as compared with the bread mixed with the intact high-amylose corn starch (Comparative Example 16), may be produced.

Example 9

Production of Pancake Mixed with Resistant Starch-Rich Starch

Egg, soft sugar, margarine, and milk were mixed according to the ratio listed in Table 23, and well-sieved cake flour, the resistant starch-rich starch obtained by the method described in Example 1, and baking powder were added and lightly mixed. The mixture was baked on a hot plate at 160° C. for 5 minutes for the first side and 3 minutes for the second side, to thereby obtain a pancake mixed with the resistant starch-rich starch.

Comparative Example 17

Production of Pancake Mixed with Intact High-Amylose Corn Starch

A pancake containing an intact high-amylose corn starch was obtained similarly to Example 9, except that the intact high-amylose corn starch exemplified in Referential Example was mixed, in place of the resistant starch-rich starch obtained by the method described in Example 1.

(Control 2) (Production of Non-Starch-Added Pancake)

A pancake not added with starch was obtained similarly to Example 9, except that cake flour was used in place of the resistant starch-rich starch obtained by the method described in Example 1.

TABLE 23

|  | Mixing ratio (parts by weight) | | |
| --- | --- | --- | --- |
|  | Control 2 | Example 9 | Comparative Example 17 |
| Cake flour | 100 | 80 | 80 |
| Resistant-starch rich starch obtained by method of Example 1 | 0 | 20 | 0 |
| High-amylose corn starch of Referential Example | 0 | 0 | 20 |
| Baking powder | 3 | 3 | 3 |
| Egg | 33 | 33 | 33 |
| Soft sugar | 17 | 17 | 17 |
| Margarine | 20 | 20 | 20 |
| Milk | 89 | 89 | 89 |
| Total | 262 | 262 | 262 |

The pancakes obtained in Example 9, Comparative Example 17 and Control 2 were crushed using a food processor, and dried overnight under air flow at 40° C. Each sample was further crushed using a mill, sieved through a 60-mesh screen, and the resistant starch content of which was measured by the AOAC Official Method 2002.02. RS contents calculated similarly as described in Example 8 are shown in Table 24. In Table 24, RS contents before baking and after baking are obtained by subtracting the RS content ascribable to wheat flour measured in Control 2.

TABLE 24

|  | RS content before baking (%) | RS content after baking (%) | Residual ratio of RS after baking (%) |
|---|---|---|---|
| Example 9 | 8.5 | 7.4 | 87 |
| Comparative Example 17 | 4.9 | 3.7 | 76 |

As is clear from Table 24, the pancake (Example 9) mixed with the resistant starch-rich starch obtained by the method described in Example 1 was not found to large decrease in the resistant starch content even after baking, proving that the pancake having a larger resistant starch content, as compared with the pancake mixed with the intact high-amylose corn starch (Comparative Example 17), may be produced.

Example 10

Production of Udon or Japanese Wheat Noodle, Mixed with Resistant Starch-Rich Starch Udon was produced according to the ratio listed in Table 25, by the method described in the next.
Method: Wheat flour and the resistant starch-rich starch obtained by the method described in were mixed using a food processor, brine was added thereto, the mixture was kneaded for 20 minutes, subjected to compound rolling and cutting (cutting edge type=#10, noodle thickness=2.0 mm), the thus obtained noodle was boiled in boiling water for 8 minutes, and then washed in running water for 30 seconds.

Comparative Example 18

Production of Udon or Japanese Wheat Noodle Mixed with Intact High-Amylose Corn Starch Udon mixed with an intact high-amylose corn starch was produced similarly to Example 10, except that the intact high-amylose corn starch exemplified in Referential Example was used in place of the resistant starch-rich starch obtained by the method described in Example 1.
(Control 3) (Production of Non-Starch-Added Udon or Japanese Wheat Noodle)
Udon not mixed with starch was obtained similarly to Example 10, except that wheat flour was used in place of the resistant starch-rich starch obtained by the method described in Example 1.

TABLE 25

|  | Mixing ratio (parts by weight) | | |
|---|---|---|---|
|  | Control 3 | Example 10 | Comparative Example 18 |
| wheat flour | 100 | 80 | 80 |
| Resistant-starch rich starch obtained by method of Example 1 | 0 | 20 | 0 |
| High-amylose corn starch of Referential Example | 0 | 0 | 20 |
| Table salt | 2.3 | 2.3 | 2.3 |
| Water | 40 | 40 | 40 |
| Total | 142.3 | 142.3 | 142.3 |

Each Udon before boiling and after boiling, obtained in Example 10, Comparative Example 18 and Control 3, was finely chopped, added with twice the volume of acetone, and crushed using a homogenizer. The mixture was allowed to stand still, the supernatant was discarded, the residue was further added with twice the volume of acetone, and homogenized to thereby dewater the udon. The thus-dewatered udon was dried under air flow and further crushed, sieved through a 60-mesh screen, and the resistant starch content of which was measured by the AOAC Official Method 2002.02. RS contents calculated similarly as described in Example 8 are shown in Table 26. In Table 26, RS contents before boiling and after boiling are obtained by subtracting the RS content ascribable to wheat flour measured in Control 3.

TABLE 26

|  | RS content before boiling (%) | RS content after boiling (%) | Residual ratio of RS (%) |
|---|---|---|---|
| Example 10 | 13.5 | 13.8 | 102 |
| Comparative Example18 | 7.4 | 6.5 | 88 |

It was confirmed from Table 26 that the udon mixed with the resistant starch-rich starch obtained by the method described in Example 1 (Example 10) was found to keep a high level of the resistant starch content even after boiling, proving that the udon having a larger resistant starch content, as compared with the udon mixed with the intact high-amylose corn starch (Comparative Example 18), may be produced.

The invention claimed is:
1. A resistant starch-rich starch which satisfies the requirements (a), (b), (c) and (d), below:
 (a) showing a resistant starch content, measured by the AOAC Official Method 2002.02 for measuring resistant starch, of 60% or more;
 (b) showing a molecular weight peak in the range from $6 \times 10^3$ or larger to $4 \times 10^4$ or smaller;
 (c) showing a molecular weight dispersion of 1.5 or larger to 6.0 or smaller; and
 (d) showing a gelatinization enthalpy, measured by differential scanning calorimetry over the range from 50° C. to 130° C., of 10 J/g or smaller.
2. The resistant starch-rich starch according to claim 1, wherein after the resistant starch-rich starch is heated at 200° C. for 20 minutes in a drying oven, the resistant starch content of the resistant starch-rich starch is 60% or more.
3. A beverage or food which contains the resistant starch-rich starch according to claim 1.
4. A method of producing a resistant starch-rich starch according to claim 1, comprising subjecting an amylose-rich starch having an amylose content of 40% or more, used as a raw material, to acid treatment in an aqueous inorganic acid solution.
5. The method of production according to claim 4, wherein the process for acid treatment takes three days or shorter.
6. The method of production according to claim 4, wherein the acid treatment is conducted at a reaction temperature T ° C. with a normality C in the aqueous inorganic acid solution for reaction time t hours that satisfy expressions (1) and (2) below:

$$5.54 \times (4.20)^{(T-40)/10})^{(-0.879)} \leq C < -0.000016 \times T^3 + 0.00068 \times T^2 - 0.028 \times T + 4.3 \quad (1)$$

$$13.0 \times C^{(-1.14)} \times (1/4.2)^{(T-40)/10} \leq t \leq 180 \times C^{(-1.58)} \times (1/4.2)^{(T-40)/10} \quad (2).$$

* * * * *